United States Patent [19]
Uchino

[11] Patent Number: 5,483,435
[45] Date of Patent: Jan. 9, 1996

[54] POWER GENERATION SYSTEM HAVING INDUCTION GENERATOR AND CONTROLLED BRIDGE RECTIFIER

[75] Inventor: Hiroshi Uchino, Hachioji, Japan

[73] Assignee: Kabushiki Kaisha Toshiba, Kawasaki, Japan

[21] Appl. No.: 209,363

[22] Filed: Mar. 14, 1994

Related U.S. Application Data

[63] Continuation of Ser. No. 50,973, Apr. 22, 1993, abandoned, which is a continuation of Ser. No. 865,684, Apr. 8, 1992, Pat. No. 5,255,175, which is a continuation of Ser. No. 522,127, May 11, 1990, abandoned.

[30] Foreign Application Priority Data

| May 15, 1989 | [JP] | Japan | 1-118706 |
| Jun. 1, 1989 | [JP] | Japan | 1-137458 |
| Jun. 28, 1989 | [JP] | Japan | 1-163777 |

[51] Int. Cl.$^6$ ............... H02M 7/04; H02M 7/219
[52] U.S. Cl. ............. 363/81; 363/87; 363/88; 363/129; 363/127
[58] Field of Search ............ 318/140, 141, 318/142, 143, 803; 322/28, 32; 363/35, 37, 57, 81, 84, 87, 88, 126, 127, 128, 129

[56] References Cited

U.S. PATENT DOCUMENTS

| 4,449,176 | 5/1984 | Turnbull | 363/81 |
| 4,620,272 | 10/1986 | Fulton et al. | 363/37 |
| 4,625,272 | 11/1986 | Okuyama et al. | 363/81 |
| 5,225,712 | 7/1993 | Erdman | 290/44 |

FOREIGN PATENT DOCUMENTS 2196448  4/1988  United Kingdom.

*Primary Examiner*—Jeffrey L. Sterrett
*Attorney, Agent, or Firm*—Oblon, Spivak, McClelland, Maier & Neustadt

[57] ABSTRACT

A power generation system is constituted by an induction generator and a converter. An output current waveform of the induction generator is determined by the magnetic flux, speed, winding impedance, DC output voltage, and load of the induction generator. In particular, the output current waveform is changed in accordance with a change in speed (i.e., change in slip). Switching elements in the converter are ON/OFF-controlled in accordance with changes in current waveform, thereby controlling power generation of the induction generator.

10 Claims, 22 Drawing Sheets

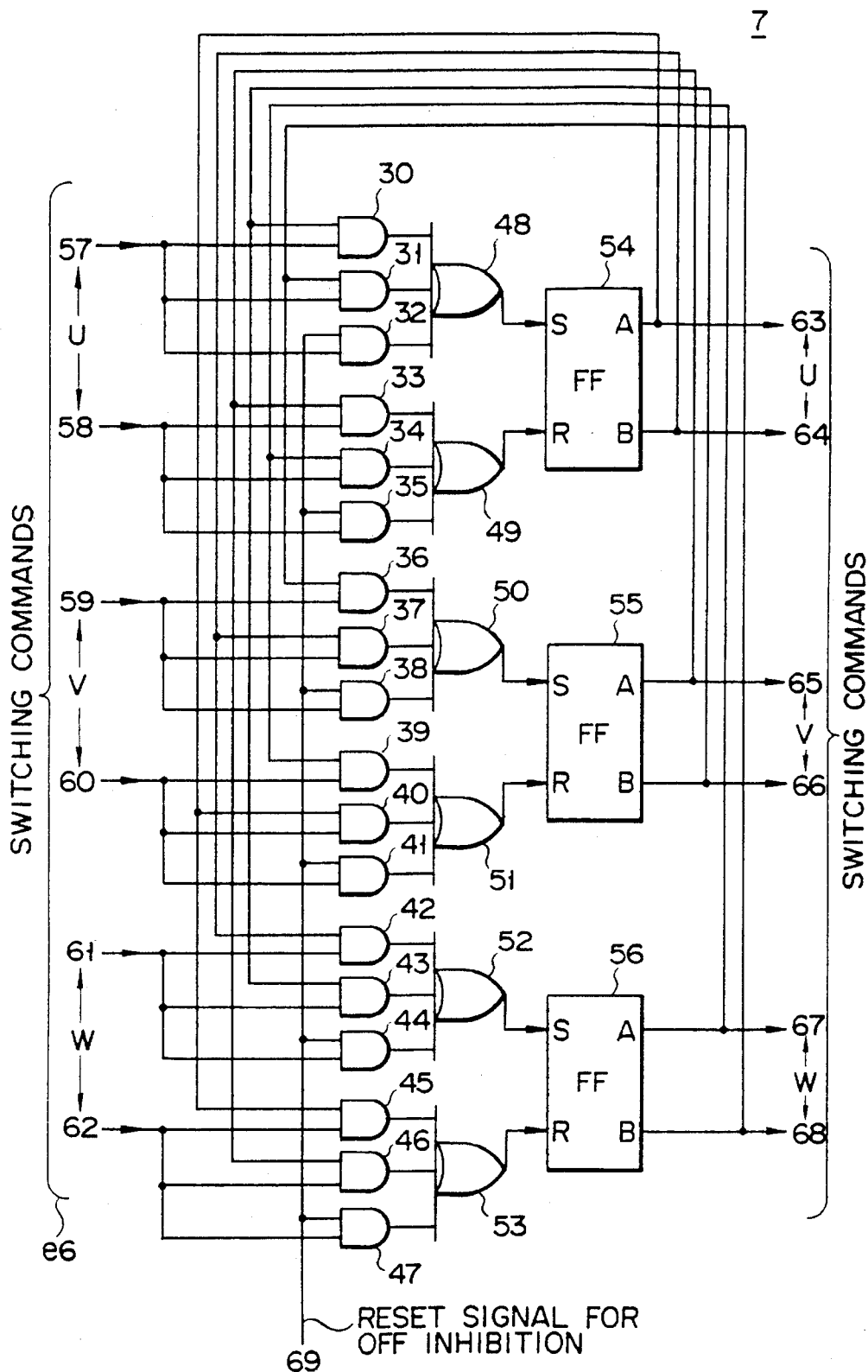
F I G. 2

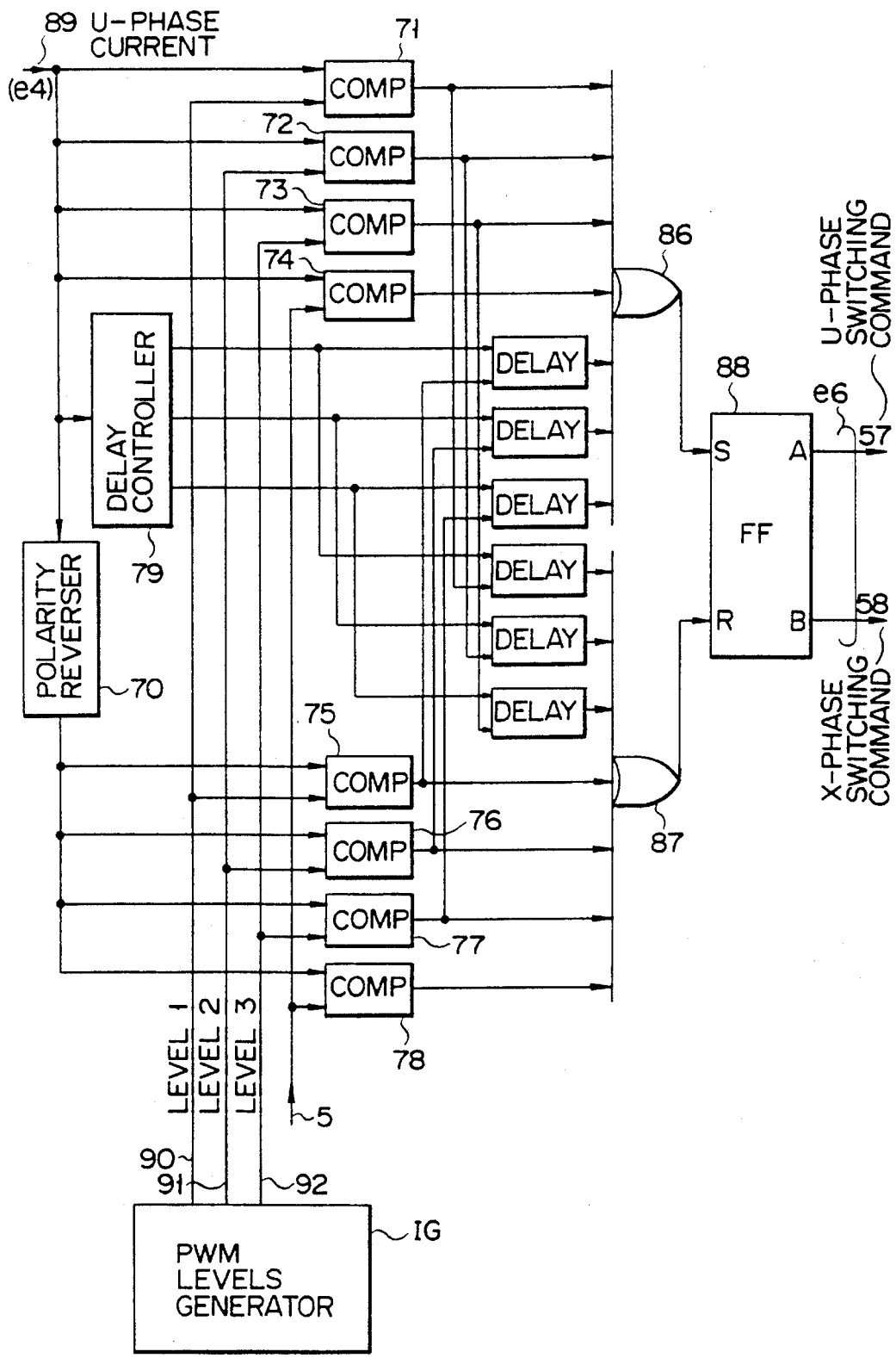
F I G. 6

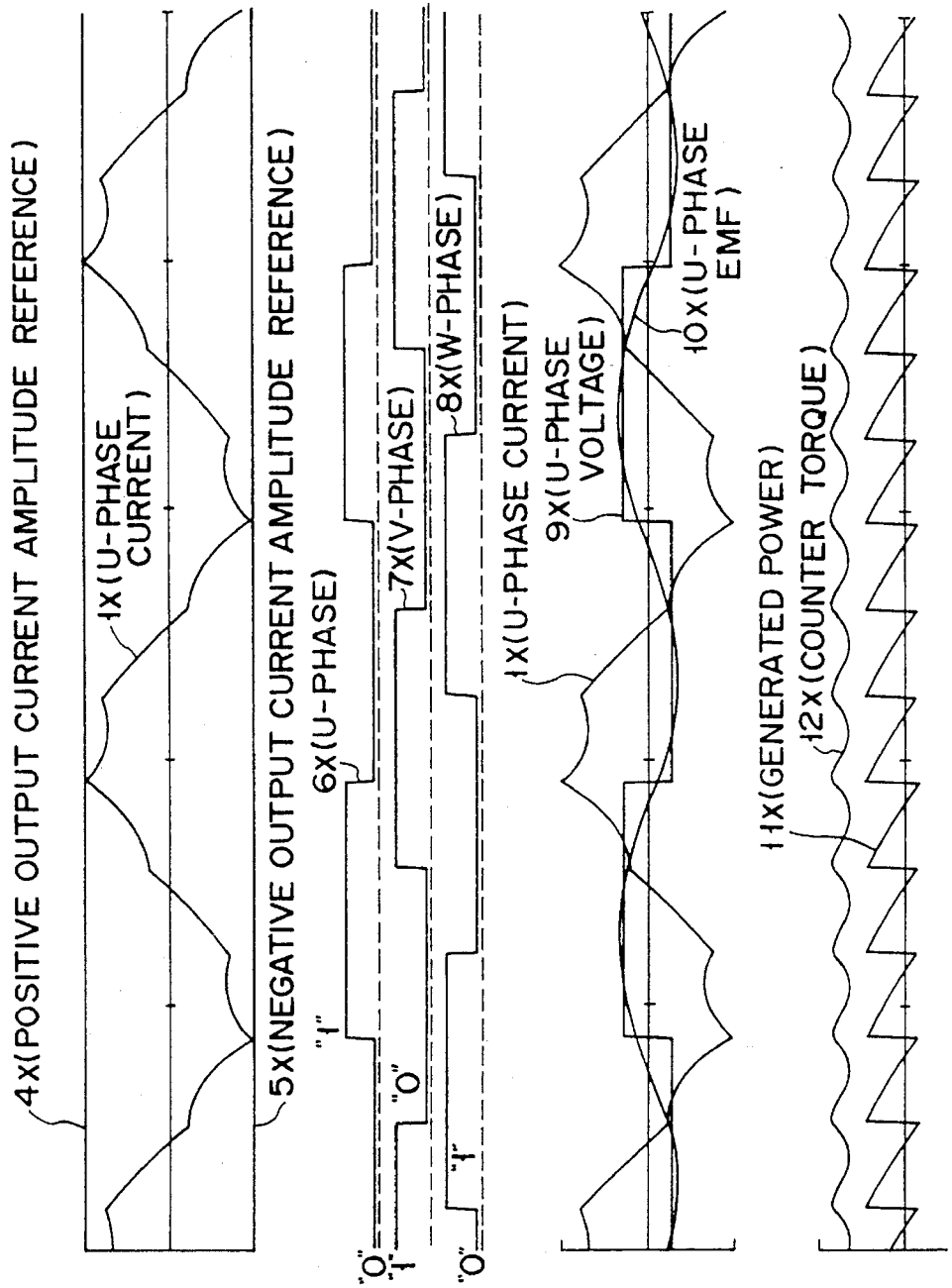

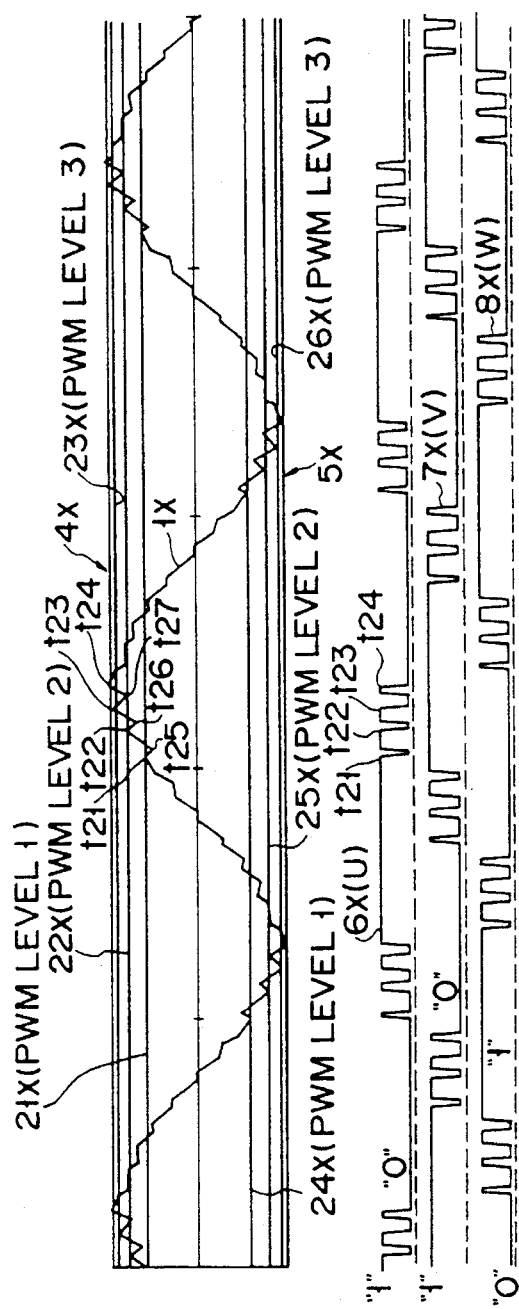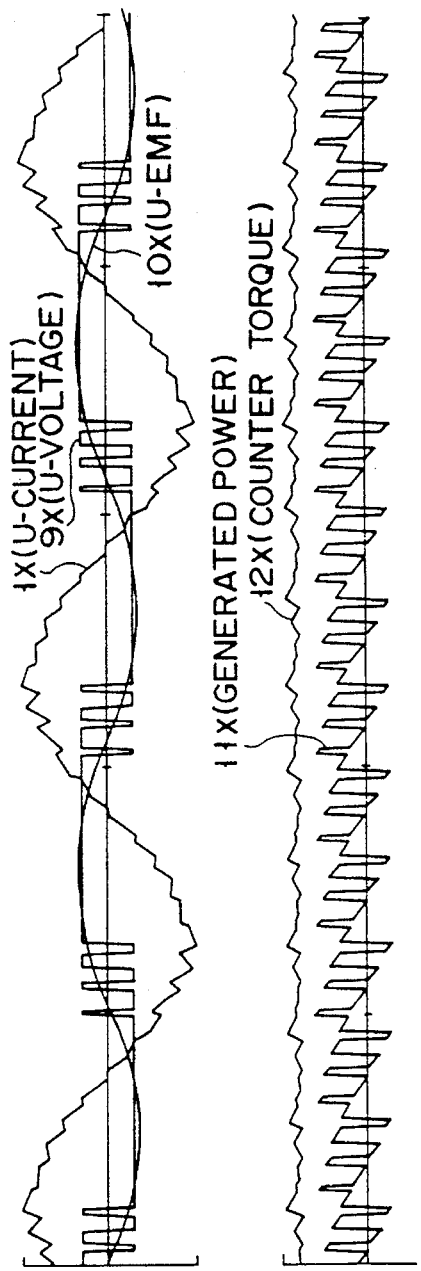
FIG. 8A
FIG. 8B
FIG. 8C
FIG. 8D
FIG. 8E
FIG. 8F

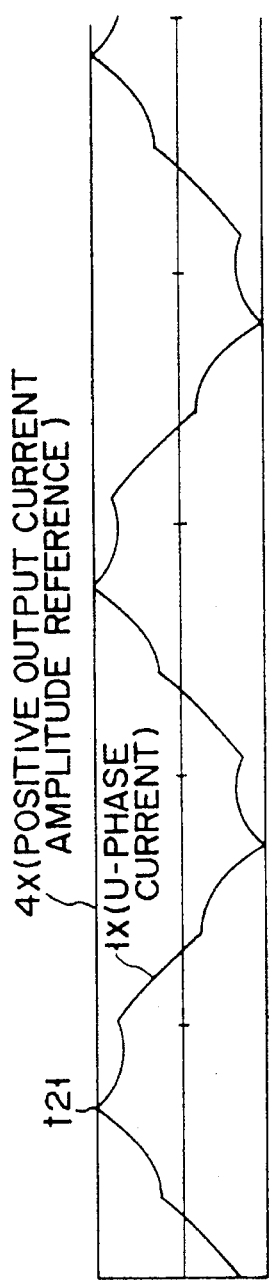
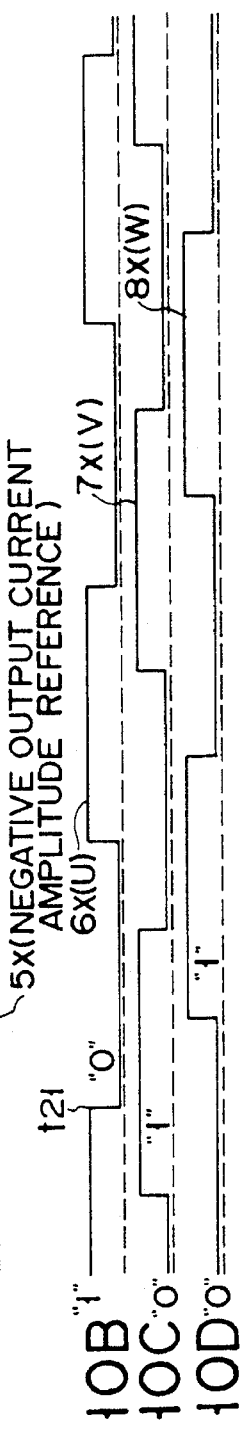
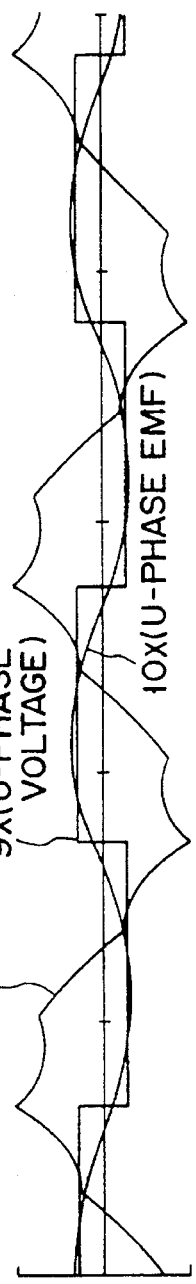
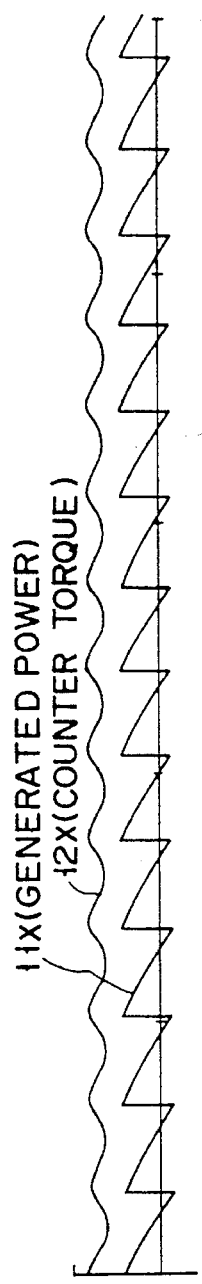
FIG. 10A
FIG. 10B
FIG. 10C
FIG. 10D
FIG. 10E
FIG. 10F

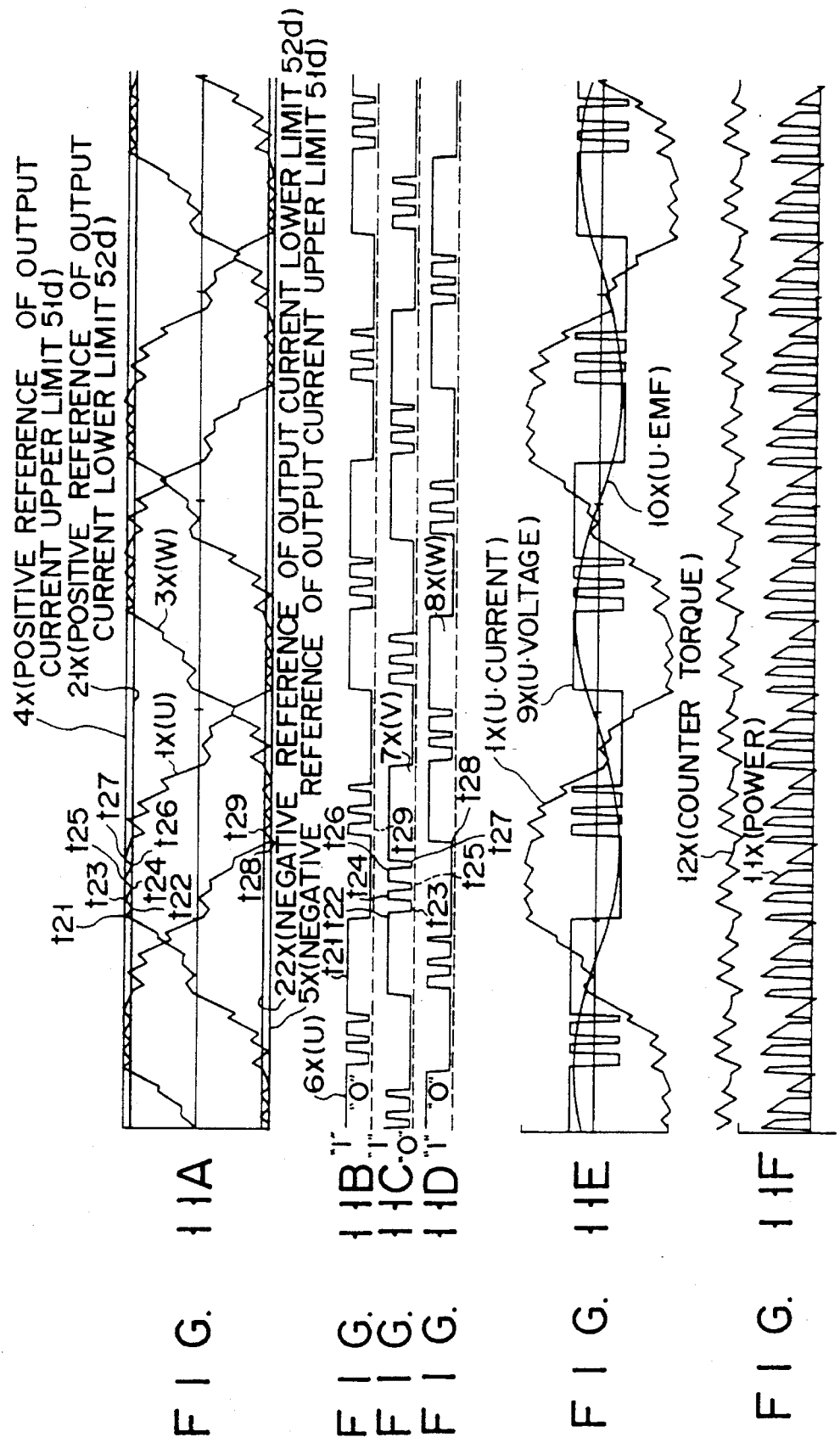

POWER GENERATION SYSTEM HAVING INDUCTION GENERATOR AND CONTROLLED BRIDGE RECTIFIER

This application is a continuation of application Ser. No. 08/050,973, filed on Apr. 22, 1993, now abandoned, which is a continuation of application Ser. No. 07/865,684 filed Apr. 8, 1992 now U.S. Pat. No. 5,255,175, which is a continuation of application Ser. No. 07/522,127 filed on May 11, 1990 abandoned.

BACKGROUND OF THE INVENTION

1. Field of the Invention

The present invention relates to a power generation system suitable for an application in which a speed of a prime mover is greatly changed, as in wind power generation and shaft power generation for obtaining power by utilizing an extra power of a machine driven by an internal combustion engine.

2. Description of the Related Art

An arrangement using a conventional generator requires a rotation detector arranged near a prime mover under severe conditions in terms of vibrations, temperature, humidity, and the like, and operation errors often occur in the rotation detector. When an output signal from the rotation detector is disturbed, an output current from an induction generator is disturbed since this current is controlled on the basis of the output signal from the rotation detector, thus disabling stable control. When precision of the rotation detector is poor, a waveform of the output current from the induction generator is distorted, and good characteristics cannot be obtained. As a result, a highly precise, expensive rotation detector is required.

SUMMARY OF THE INVENTION

It is a first object of the present invention to provide a power generation system which does not require a rotation detector.

It is a second object of the present invention to provide a waveform control apparatus which can improve a waveform of an output current from an induction generator in the region of low output frequencies.

It is a third object of the present invention to provide a pulse width modulation (to be referred to as PWM hereinafter) control apparatus which can improve a waveform of an output current from an induction generator in the region of low output frequencies.

It is a fourth object of the present invention to provide an apparatus for controlling operating characteristics of an induction generator by modifying a waveform of an output current from an induction generator and changing a slip of the induction generator.

It is a fifth object of the present invention to provide an apparatus for stably increasing an output from an induction generator by controlling an output current waveform during an increase in output current from an induction generator.

The present invention is constituted by an induction generator and a converter. In a power generation system for obtaining a DC output from the converter, an output current waveform of the induction generator is determined by the magnetic flux, rotating speed, winding impedance, DC output voltage, and DC output current. In particular, the output current waveform is changed following to a change in rotating speed. The present invention is based on this finding, and the converter is controlled in accordance with the current waveform, thereby performing stable power generation control without using a rotation detector.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A shows an example of the voltage controller in FIG. 1;

FIG. 2 is a diagram showing a detailed arrangement of a logic circuit in FIG. 1;

FIG. 6 is a diagram showing a detailed arrangement of a PWM control unit in a logic circuit constituting the present invention;

FIGS. 7A to 7F are waveform charts showing operations in a rectangular wave control mode;

FIGS. 8A to 8F are waveform charts showing operations in a PWM control mode;

FIGS. 10A to 10F are waveform charts showing operations in a rectangular wave control mode;

FIGS. 11A to 11F are waveform charts showing operations in a current waveform control mode;

DETAILED DESCRIPTION OF THE PREFERRED EMBODIMENTS

Figure 1:
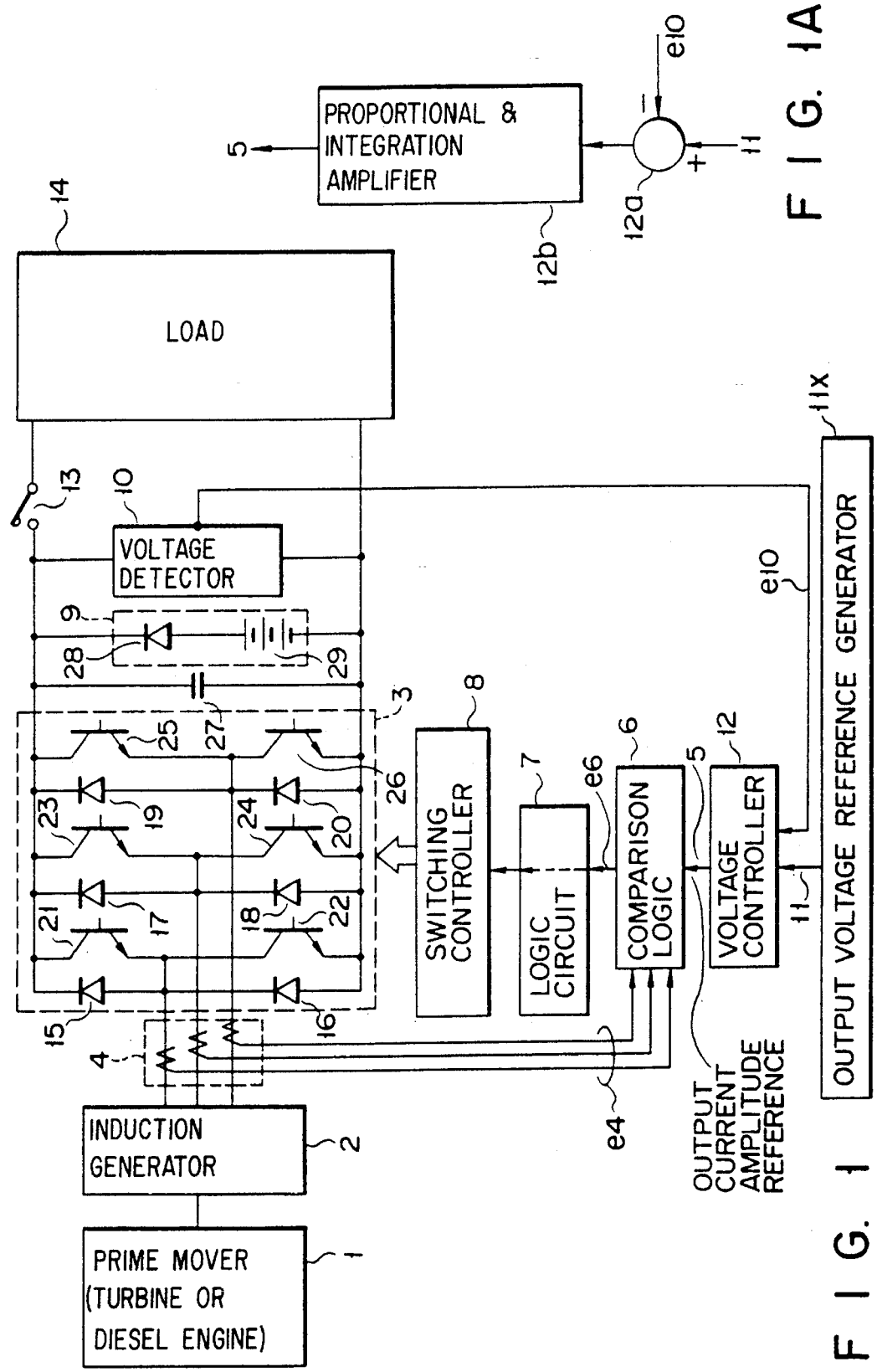
FIG. 1 is a diagram showing an embodiment of the present invention.

Preferred embodiments of the present invention will be described with reference to the accompanying drawings. Referring to FIG. 1, reference numeral 1 denotes a prime mover such as a turbine or diesel engine; 2, an induction generator driven by prime mover 1; 3, a converter for converting an AC output from induction generator 2 into a DC output; 4, a current detector for detecting an output current from induction generator 2; 8, a switching controller for controlling switching elements (21 to 26) of converter 3; 9, an initial excitation DC power source connected to the DC circuit of converter 3; 10, a voltage detector for detecting an output voltage of converter 3; 11, an output voltage reference for converter 3, which is derived from output voltage reference generator 11x; 13, a circuit breaker for turning on/off the power supplied from converter 3 to a load; and 14, a load. Reference numerals 15 to 20 denote diodes; and 21 to 26, transistors. Diodes 15 to 20 and transistors 21 to 26 are connected to form a bridge circuit, thereby constituting converter 3. Reference numeral 27 denotes a capacitor for smoothing an output voltage of converter 3.

Initial excitation DC power source 9 comprises, e.g., diode 28 and battery 29. Reference numeral 5 denotes an output current amplitude reference; 6, a comparison logic for comparing output current e4 generated by induction generator 2 and detected by current detector 4 with output current amplitude reference 5; 7, a logic circuit for regulating a switching order of converter 3 on the basis of an output (switching command) e6 from comparison logic 6 when a power generation operation is started; and 12, a voltage controller for comparing output voltage reference 11 with output voltage e10 from converter 3 and controlling frequency-independent output current amplitude reference 5 on the basis of a difference between reference 11 and output voltage e10. Voltage controller 12 can be constituted by a combination of comparator 12a and proportional-integration amplifier 12b, as shown in FIG. 1A.

FIG. 2 is a detailed diagram of logic circuit 7 shown in FIG. 1. Reference numerals 30 to 47 denote AND gates; 48 to 53, OR gates; 54 to 56, flip-flops; 57 to 62, switching commands for transistors 21 to 26; 63 to 68, switching commands for transistors 21 to 26; and 69, a reset signal for off-inhibition.

FIGS. 3A to 3G are waveform charts showing operations of this embodiment in an initial state wherein an induction generator is excited to raise a voltage. Referring to FIGS. 3A to 3G, reference numeral 1x denotes a U-phase current of induction generator 2; 2x, a V-phase current; 3x, a W-phase current; 4x, a positive reference of output current amplitude references 5; and 5x, a negative reference thereof. Reference numeral 6x denotes a signal representing ON/OFF states of U-phase transistors 21 and 22. When signal 6x is set at "1", transistor 21 is ON and transistor 22 is OFF. When signal 6x is set at "0", transistor 21 is OFF and transistor 22 is ON. Similarly, reference numeral 7x denotes a signal representing ON/OFF states of V-phase transistors 23 and 24; and 8x, a signal representing ON/OFF states of W-phase transistors 25 and 26. Reference numeral 9x denotes a U-phase voltage; 10x, a U-phase induced voltage; 11x, a power generated by induction generator 2; 12x, a counter torque of induction generator 2; 13x, output voltage reference 11; 14x, an output voltage from converter 3.

Figure 3:
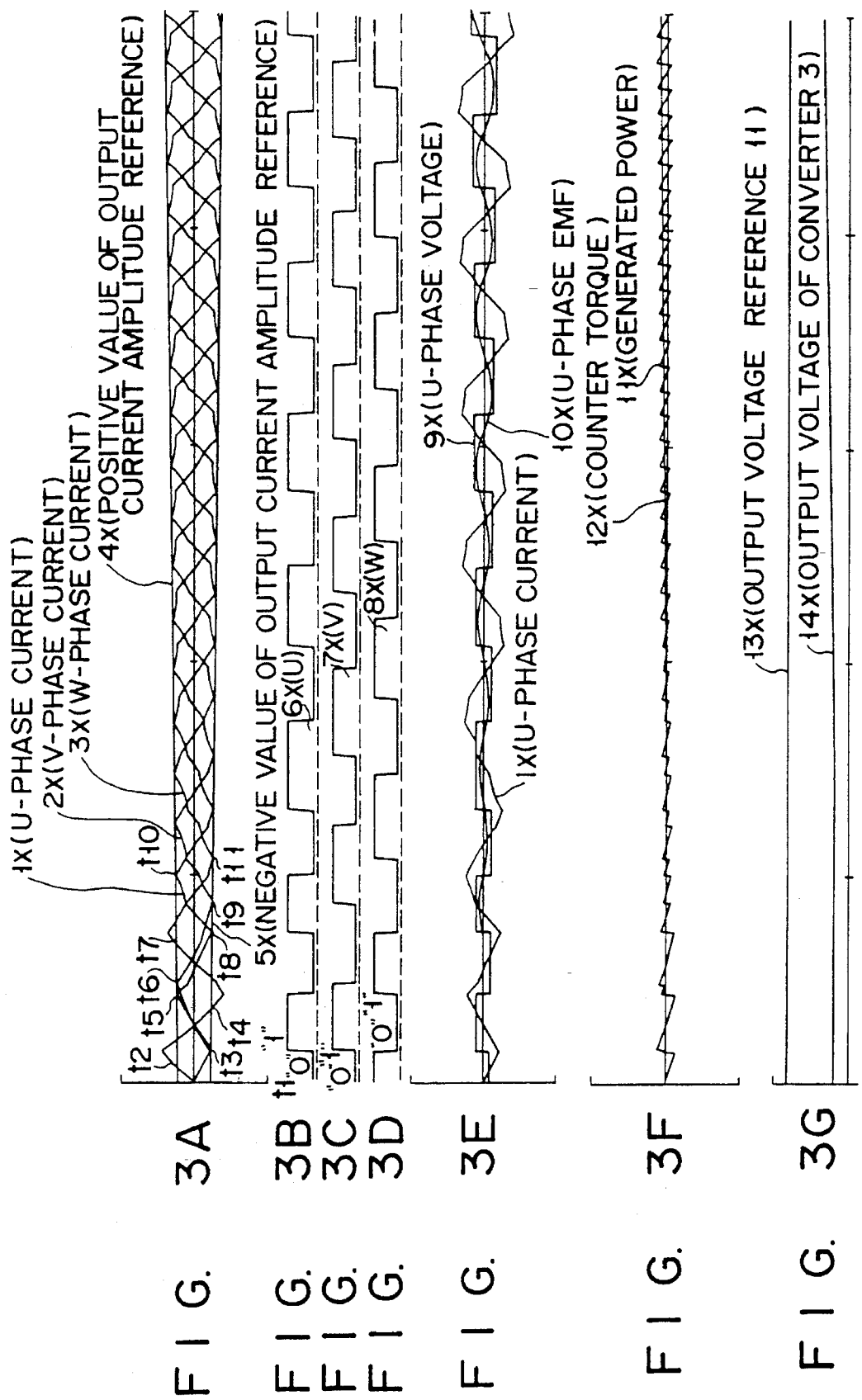
FIGS. 3A to 3G are waveform charts showing the function of the present invention in an initial state wherein an induction generator is energized to raise a voltage.
Figure 4:
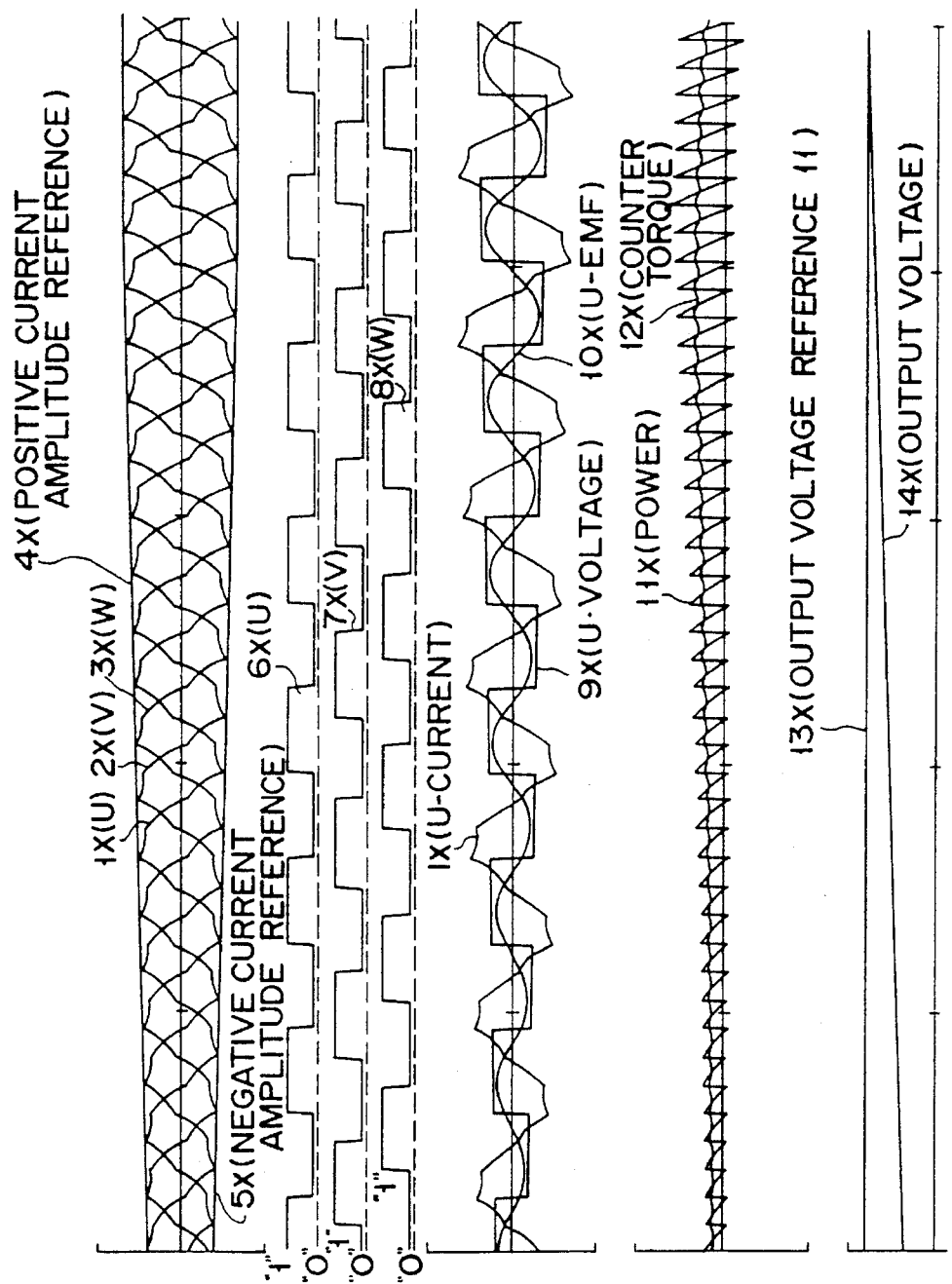
FIGS. 4A to 4G are waveform charts showing the function of the present invention in a process for raising the voltage of the induction generator to a reference value.
Figure 5:
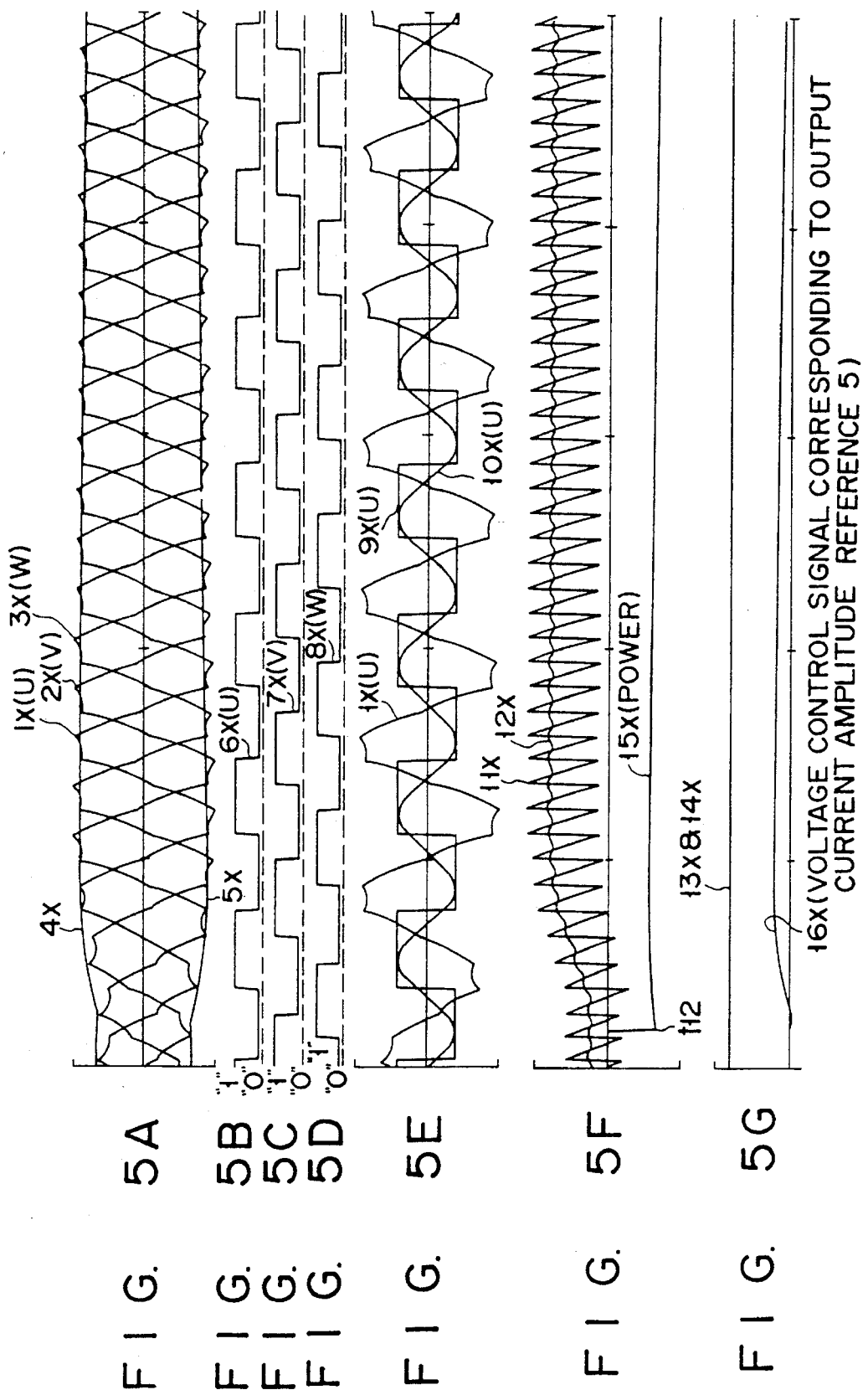
FIGS. 5A to 5G are waveform charts showing the function of the present invention in a process for applying the induction generator voltage raised to the reference value to a load, thereby performing voltage control.

When transistors 22, 24, and 25 are turned on at time t1 in FIG. 3, a current is supplied from initial excitation DC power source 9. W-phase current 3x is increased in the positive direction, and U- and V-phase currents 1x and 2x are increased in the negative direction.

At time t2, W-phase current 3x reaches amplitude reference 4x. At this time, if W-phase transistor 25 is turned off and transistor 26 is turned on, transistors 22, 24, and 26 constituting a lower arm of converter 3 are simultaneously turned on, and a voltage applied to induction generator 2 becomes zero. U-, W-, and W-phase currents are then attenuated to zero. Therefore, a state in which transistors 22, 24, and 26 constituting the lower arm are simultaneously turned on, and a state in which the transistors constituting the upper arm are simultaneously turned on must be inhibited.

Logic circuit 7 (FIG. 2) including an off-inhibition condition is operated as follows. At time t2, W-phase current 3x reaches amplitude reference 4x, and transistor 25 switching command 61 is set at "1". At this time, the other input of AND gate 42 is set at "0" since transistor 22 is ON. The other input of AND gate 43 is "0" since transistor 24 is ON. If the other input of AND gate 44 does not receive a reset signal for off-inhibition and is set at "0", transistor 25 switching command 61 is not transmitted to the next OR gate 52.

When U-phase current 1x reaches amplitude reference 5x at time t3, transistor 22 switching command 58 is set to "1". The other input of AND gate 33 is set at "1" since transistor 23 is OFF. An output from AND gate 33 then goes to "1", and this signal passes through OR gate 49 and resets flip-flop 54. For this reason, transistor 22 switching command 64 as an inverted output from flip-flop 54 goes to "1", and transistor 22 is turned off. At the same time, transistor 22 switching command 63 as a noninverted output from flip-flop 54 goes to "0" to turn on transistor 21.

In the above operations, when transistor 22 switching command 64 goes to "1", an output from AND gate 42 goes to "1" since transistor 25 switching command 61 is set at "1". The signal from AND gate 42 passes through OR gate 52 and sets flip-flop 56. Transistor 25 switching command 67 as a noninverted output from flip-flop 56 goes to "1" to turn off transistor 25. At the same time, transistor 26 switching command 68 as an inverted output from flip-flop 56 goes to "0" to turn on transistor 26.

When V-phase current reaches amplitude reference 5x, transistor 24 switching command 60 goes to "1". The other input of AND gate 39 is set at "1" since transistor 25 is OFF. An output from AND gate 39 goes to "1", and this signal passes through OR gate 51 and resets flip-flop 55. For this reason, transistor 24 switching command 66 as an inverted output from flip-flop 55 goes to "1" to turn off transistor 24. At the same time, transistor 23 switching command 65 as a noninverted output from flip-flop 55 goes to "0" to turn on transistor 23.

By the above series of operations, transistors 21, 23, and 26 are set in an ON state, and transistors 22, 24, and 25 are set in an OFF state. U- and V-phase currents 1x and 2x are changed in the positive direction, and W-phase current 3x is changed in the negative direction. The above operations are repeated until time t10. In this manner, converter 3 is controlled such that the output current from induction generator 2 does not exceed output current amplitude reference 5 (4x, 5x).

When W-phase current 3x reaches amplitude reference 5x at time t11, transistor 26 switching command 62 goes to "1". Since transistor 21 is already turned off at time t10, transistor 21 switching command 63 has been set at "1". An output from AND gate 45 goes to "1" and this signal passes through OR gate 53 and resets flip-flop 56. Transistor 26 switching command 68 as an inverted output from flip-flop 56 goes to "1" to turn off transistor 28. At the same time, transistor 25 switching command 67 as a noninverted output from flip-flop 56 goes to "0" to turn on transistor 25.

In the subsequent operations, the off-inhibitic need not be performed, and reset signal 69 for off-inhibition can be set to "1". Transistor (21 to 26) switching commands 57 to 62 are unconditionally transmitted to the next stage by AND gates 32, 35, 38, 41, 44, and 47 except that reset signal 69 for off-inhibition is set to "1".

In the above switching control, when positive and negative references 4x and 5x of output current amplitude references 5 are gradually increased, timings at which U-, V-, and W-phase currents 1x, 2x, and 3x reach positive or negative reference 4x or 5x are delayed. Frequencies of U-, V-, and W-phase currents are thus gradually reduced. A slip applied to induction generator 2 in the power generation direction is increased, and then an electromotive force is increased. Output voltage 14x of converter 3 is increased accordingly. When this voltage becomes higher than that of battery 29, diode 28 is reverse-biased, and initial excitation DC power source 9 is disabled.

FIGS. 4A to 4G are waveform charts showing the function of the present invention in the process for raising a voltage of the induction generator to the reference value. Positive and negative references 4x and 5x of output current amplitude references 5 are increased to increase U-, V-, and W-phase currents 1x, 2x, and 3x. Output voltage 14x from converter 3 comes close to output voltage reference 11 represented by 13x.

FIGS. 5A to 5G are waveform charts showing the function of the present invention in the voltage control process in which a voltage obtained by raising the voltage of the induction generator to the reference is applied to a load. When circuit breaker 13 is turned on at time t12, power 15x is supplied to load 14. At this time, although output voltage 14x from converter 3 is lower than output voltage reference 11 represented by 13x, voltage controller 12 is rendered active and voltage control signal 16x corresponding to a difference is generated. When positive and negative references 4x and 5x of current amplitude references 5 are changed in accordance with this signal 16x, U-, V-, and W-phase currents 1x, 2x, and 3x can be controlled. In this manner, output voltage 14x of converter 3 can be controlled.

Comparison logic 6 in FIG. 1 compares an output current of induction generator 2 which is detected by current detector 4 with output current amplitude reference 5 and a PWM amplitude reference. Comparison logic 6 then generates a reference for turning off switching elements constituting converter 3.

FIG. 6 is a detailed diagram of this logic 6, showing only a U-phase component. Reference numeral 57 denotes a switching command for transistor 21; 58, a switching command for transistor 22; 70, a polarity reverser; 71 to 78, comparators; 79, a delay controller; 80, delay circuits; 86 and 87, OR gates; 88, a flip-flop; and 89, a U-phase current. Reference numerals 90, 91, and 92 denote PWM amplitude reference levels output from PWM levels generator IG. That is, reference 90 is of PWM level 1; 91, PWM level 2; and 92, PWM level 3.

FIGS. 7A to 7F are waveform charts showing operations in a rectangular wave control mode in the region of low output frequencies according to this embodiment. Reference numerals 4x to 12x in FIGS. 7A to 7F denote the same signals in FIGS. 5A to 5G. Wave distortion of U-phase current 1x is increased in the region of low output frequencies, and a pulsation component of counter torque 12x is also increased. As a result, a sufficient output cannot be obtained.

FIGS. 8A to 8F are waveform charts showing operations in the PWM control mode under the same operating conditions as in FIGS. 7A to 7F. Reference numerals 1x and 4x to 12x in FIGS. 8A to 8F denote the same signals as in FIGS. 7A to 7F. Reference numerals 21x and 24x denote PWM level 1 and PWM level 2, respectively; 22x and 25x, PWM level 2; and 23x and 26x, PWM level 3. When U-phase current 1x reaches PWM level 1 (21x) at timeout 21, a pulse of level "1" appears at the output of comparator 71 in FIG. 6, and this pulse passes through OR gates 86 and sets flip-flop 88. For this reason, transistor 21 switching command 57 goes to "1" to turn off transistor 21. At the same time, transistor 22 switching command 58 goes to "0" to turn off transistor 22. The pulse of level "1" appearing at the output of comparator 71 is supplied to delay circuit 83. When a predetermined period of time set by delay controller 79 elapses, delay circuit 83 generates a pulse of level "1" at time t25. This signal is supplied as a reset signal to flip-flop 88 through OR gate 87. For this reason, transistor 22 switching command 58 goes to "1" to turn off transistor 22. At the same time, transistor 21 switching command 57 goes to "0" to turn on transistor 21.

U-phase current 1x rises again and reaches PWM level 2 (22x) at time t22. At this time, comparator 72 and delay circuit 84 are operated in the same manner as described above. When U-phase current 1x is further increased and reaches PWM level 3 (23x) at time t23, comparator 73 and delay circuit 85 are operated in the same manner as described above. U-phase current 1x is further increased and reaches output current amplitude reference 4x at time t24. In this case, a pulse of level "1" appears at the output of comparator 74, and this pulse is supplied as a set signal to flip-flop 88 through OR gate 86. For this reason, transistor 21 switching command 57 goes to "1" to turn off transistor 21. At the same time, transistor 22 switching command 58 goes to "0" to turn on transistor 22. The delay circuit does not operate this time, and the U-phase current is continuously reduced.

When the level of the U-phase current is reduced, crosses the zero level, and exhibits a negative polarity, the U-phase current having an inverted polarity of a polarity appearing at the output of polarity reverser 70 becomes positive. Comparators 75 to 78 and delay circuits 80 to 82 operate as described above. According to the operation of delay controller 79, a period of, e.g., U-phase current 89 is detected, and delay times of delay circuits 80 to 85 are controlled in accordance with the detected period, thereby obtaining a constant electric angle during the OFF time regardless of changes in frequency. PWM level 1 to PWM level 3 have values proportional to output current amplitude references 5, respectively. For example, a constant smaller than 1 is multiplied with output current amplitude references 5 to obtain the above level values. In the above description, the number of PWM levels is three. However, the number of PWM levels may be any arbitrary value of one or more.

In this manner, in PWM control according to this embodiment, the number of current amplitude levels for PWM is set, and the switching elements are kept OFF for a predetermined period of time every time the output current reaches the preset level. Therefore, frequency components are not included in the current reference, and no rotation detector need be used.

The operations in the U phase have been described above, and this description applies to the V and W phases.

Comparison logic 6 in FIG. 1 compares an output current generated by induction generator 2 and detected by current detector 4 with output current amplitude upper limit reference 5 and an output current amplitude lower limit reference given in association therewith. Comparison logic 6 then generates a reference for controlling the switching elements of converter 3.

Figure 9:
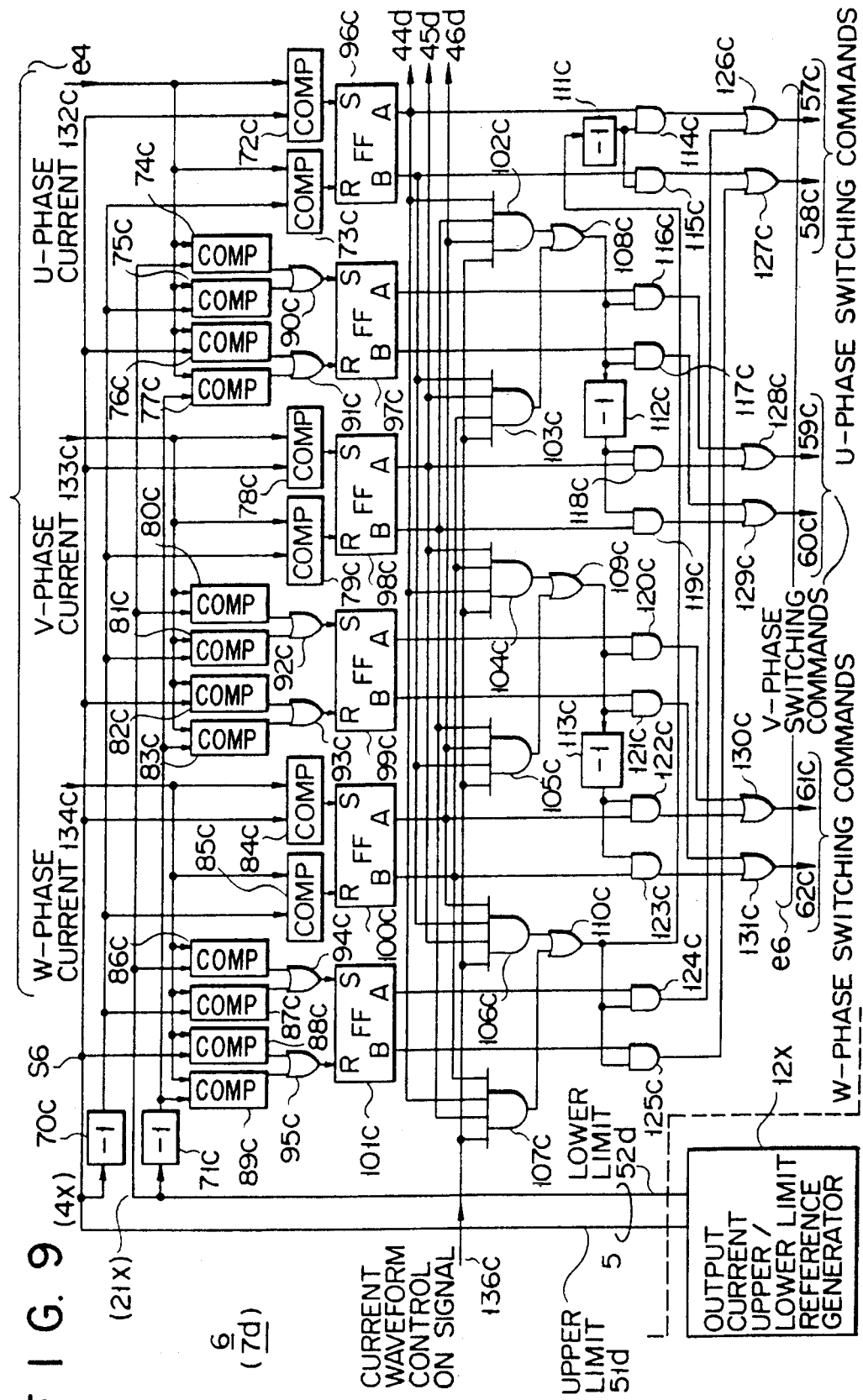
FIG. 9 is a diagram showing a detailed arrangement of a current waveform control unit in the logic circuit constituting the present invention.

FIG. 9 is a detailed diagram of this logic 6. Reference numeral 51d denotes an output current amplitude upper limit reference; 57c to 62c, switching commands for transistors 21 to 26; 70c and 71c, polarity reversers; 72c to 89c, comparators; 90c to 95c, OR gates; 96c to 101c, flip-flops; 102c to 107c, AND gates; 108c to 110c, OR gates; 111c to 113c, NOT gates; 114c to 125c, AND gates; 126c to 131c, OR gates; 132c, a U-phase current; 133c, a V-phase current; and 134c, a W-phase current. Reference numeral 52d denotes an output current amplitude lower limit reference; 136c, a current waveform control ON signal; and 12x, a circuit for generating amplitude upper and lower limit references 51d and 52d of the output current.

FIGS. 10A to 10F are waveform charts showing operations in the rectangular wave control mode in the region of low output frequencies according to this embodiment. Reference numerals 1x and 4x to 12x denote the same signals as in FIGS. 5A to 5F. When U-phase current 1x reaches positive reference value 4x of output current amplitude upper limit reference 51d at time t21, transistor 21 is turned off and transistor 22 is turned on. The U-phase current is then reduced, and a sufficient output cannot be obtained.

FIGS. 11A to 11F are waveform charts showing operations in the waveform control under the same operating conditions as in FIGS. 10A to 10F according to this embodiment. Reference numerals 1x and 4x to 12x in FIGS. 11A to 11F denote the same signals as in FIGS. 10A to 10F. Reference numeral 3x denotes a W-phase current; 21x, a positive reference of output current amplitude lower limit reference 52d; and 22x, a negative reference thereof.

When U-phase current 1x reaches amplitude upper limit reference 4x at time t21, a pulse of level "1" appears at the output of comparator 72c in FIG. 9 and supplies a set signal to flip-flop 96c. For this reason, the A output from flip-flop 96c goes to "1", and this signal of level "1" passes through AND gate 114c and OR gate 126c to set transistor 21 switching command 57c to "1", thereby turning off transistor 21. At the same time, the B output from flip-flop 96c goes to "0", and this signal of level "0" passes through AND gate 115c and OR gate 127c to set transistor 22 switching command 58c to "0", thereby turning on transistor 22.

When U-phase current 1x is reduced and reaches amplitude lower limit reference 21x at time t22, a pulse of level "1" appears at the output of comparator 74c, and this signal of level "1" passes through OR gate 90c and is supplied as a set signal to flip-flop 97c. For this reason, the A output from flip-flop 97c is set at "1", and the output signal of level "1" is then supplied to AND gate 116c.

At this time, AND gate 102c receives an A output of level "1" from flip-flop 96c, a B output of level "1" from flip-flop 98c, and an A output of level "1" of flip-flop 100c. In this case, if current waveform control ON signal 136c is set at "1", an output from AND gate 102c is set at "1". An output from OR gate 108c is set at "1", and an output from NOT gate 112c is set at "0". The other input of each of AND gates 116c and 117c is set at "1", and a signal from flip-flop 97c can pass through AND gates 116c and 117c.

A signal of level "0" is input from NOT gate 112c to the other input of each of AND gates 118c and 119. Gating of the output from flip-flop 112c is inhibited. When flip-flop 97c is set and its A output goes to "1" at time t22, this signal passes through AND gate 116c and OR gate 128c to set transistor 23 switching command 59c to "1", thereby turning off transistor 23. At the same time, the B output from flip-flop 97c goes to "0", and this signal passes through AND gate 117c and OR gate 129c to set transistor 24 switching command 60c to "0", thereby turning on transistor 24. At this time, since transistors 22 and 26 have been kept ON, the transistors constituting the lower arm of converter 3 are simultaneously turned on to short-circuit the three phase output terminals of induction generator 2.

The U-phase current is increased again. When U-phase current 1x is increased and reaches amplitude upper limit reference 4x at time t23, a pulse of level "1" appears at the output of comparator 76c, and this pulse passes through OR gate 91c and is supplied as a reset signal to flip-flop 97c.

When flip-flop 97c is reset and the B output goes to "1", this signal of level "1" passes through AND gate 117c and OR gate 129c to set transistor 24 switching command 60c, thereby turning off transistor 24. At the same time, the A output from flip-flop 97c goes to "0", and this signal of level "0" passes through AND gate 116c and OR gate 128c to set transistor 23 switching command 59c to "0", thereby turning on transistor 23. Therefore, the output terminal of induction generator 2 is released from a simultaneous three-phase short-circuiting state.

The U-phase current is decreased again. Transistors 23 and 24 are ON/OFF-controlled from time t24 to time t27 in the same manner as described above. U-phase current 1x is controlled within the width between output current amplitude upper limit reference 4x and output current amplitude lower limit reference 21x.

When W-phase current 3x reaches negative reference 5x of amplitude upper limit references at time t28, transistor 25 is turned on and transistor 26 is turned off. When W-phase current 3x is decreased and reaches negative reference 22x of amplitude lower limit references, transistors 21 and 22 are ON/OFF-controlled in the same manner as described above. When W-phase current 3x is decreased and reaches negative reference 22x of the amplitude lower limit references, transistors 21 and 22 are ON/OFF-controlled in the same manner as described above. W-phase current 3x is controlled to fall within the width of negative reference 5x of the output current amplitude upper limit references and negative reference 22x of the output current amplitude lower limit references. The subsequent operations are performed as described above.

Figure 12:
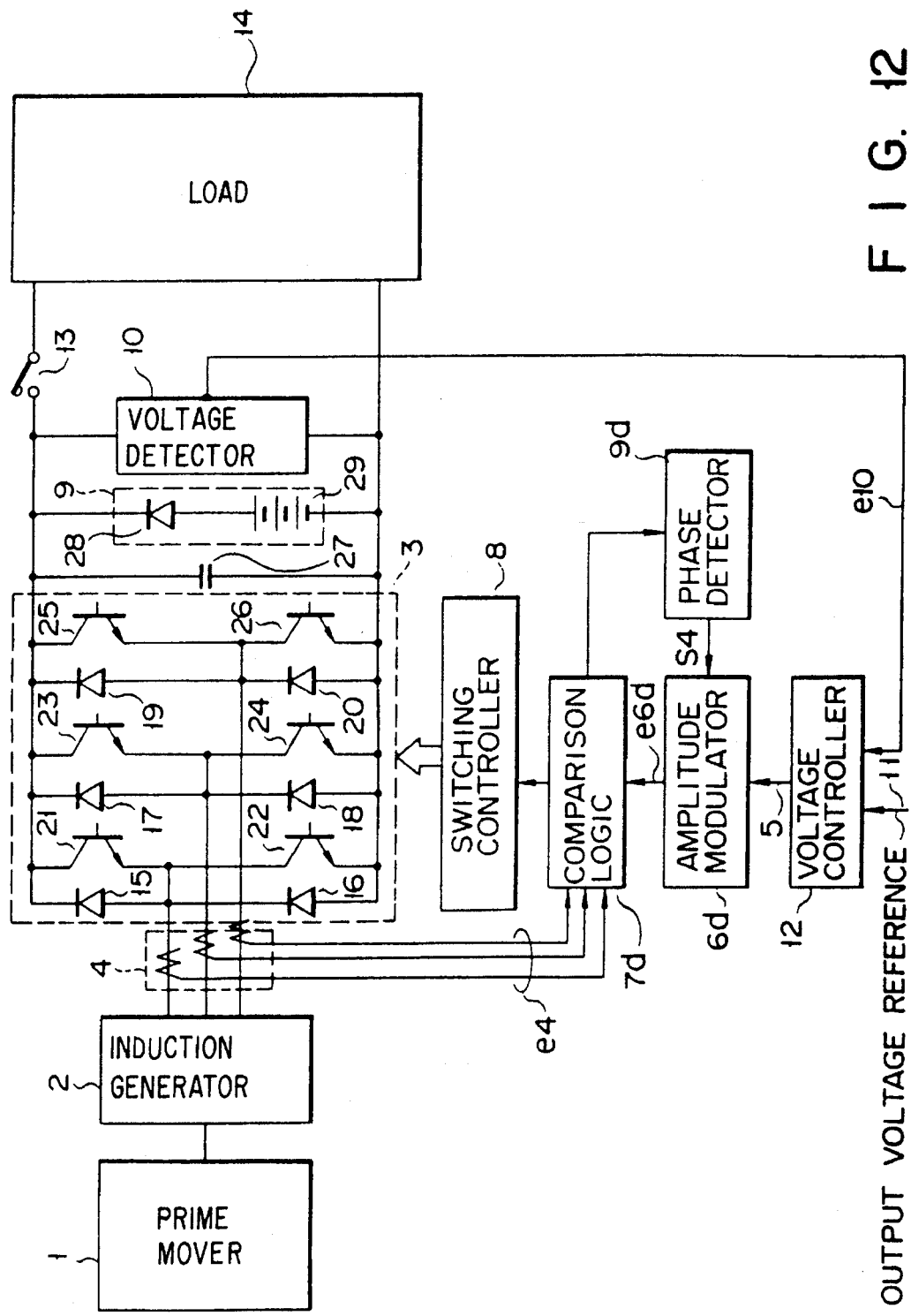
FIG. 12 is a diagram showing a power generation system according to another embodiment of the present invention.

FIG. 12 is a diagram showing a power generation system according to another embodiment of the present invention. Reference numerals 1 to 5, 8, 10 to 13, and 15 to 27 in FIG. 12 denote the same parts as in FIG. 1. Reference numeral 6d denotes an amplitude modulator for amplitude-modulating output current amplitude reference 5 in accordance with an output current phase. Reference numeral 7d denotes a comparison logic for comparing amplitude reference e6d supplied from amplitude modulator 6d for an output current from induction generator 2 with output current e4 generated by induction generator 2 and detected by current detector 4 and for generating a reference for controlling switching elements (21 to 26) of converter 3. The circuit configuration of comparison logic 7d may be substantially the same as that shown in FIG. 9, except that logic 7d does not require generator 12x in FIG. 9. Reference numeral 9d denotes a phase detector for detecting the phase of output current e4 of induction generator 2.

Figure 13:
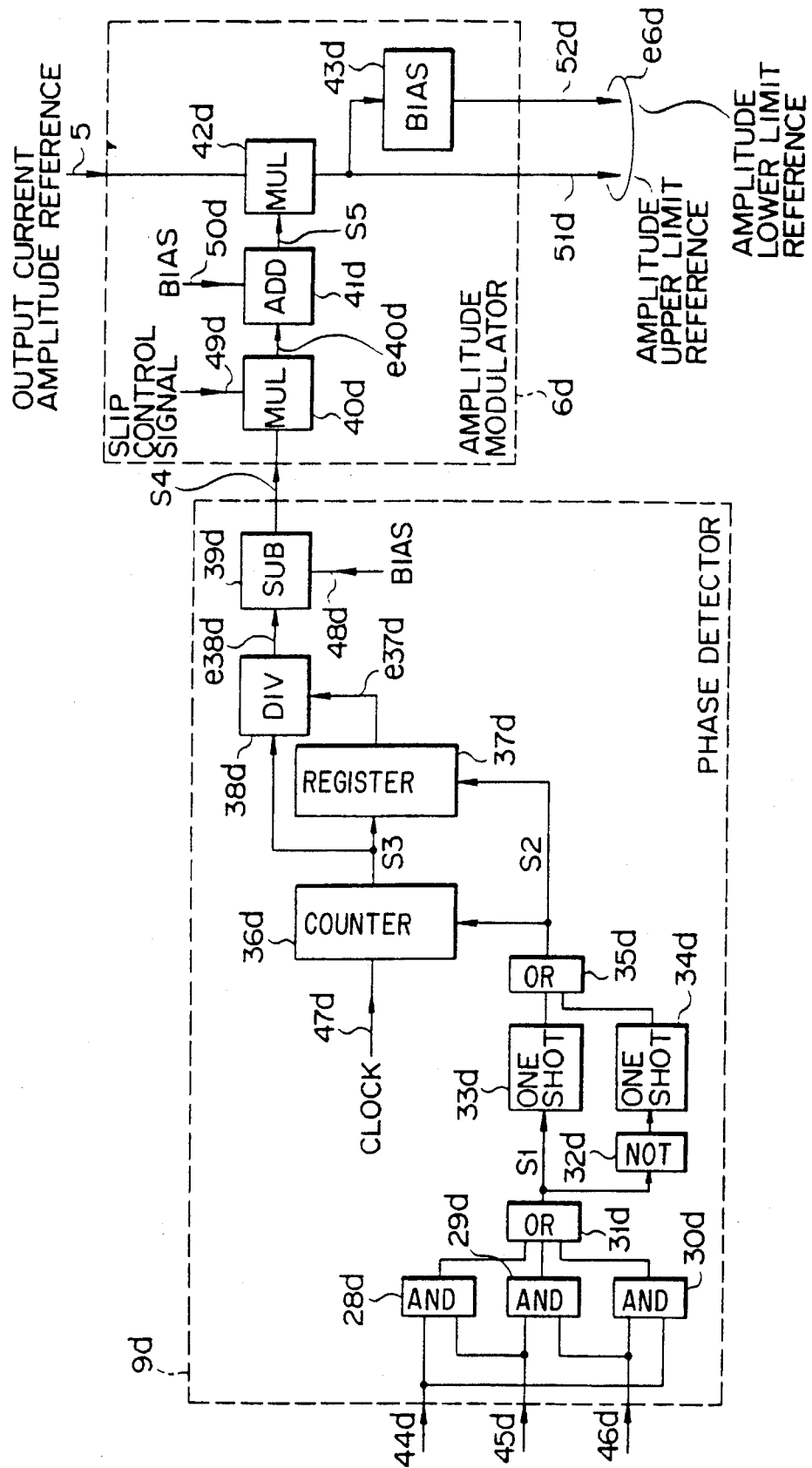
FIG. 13 is a diagram showing a detailed arrangement of an amplitude modulator and a phase detector.
Figure 14:
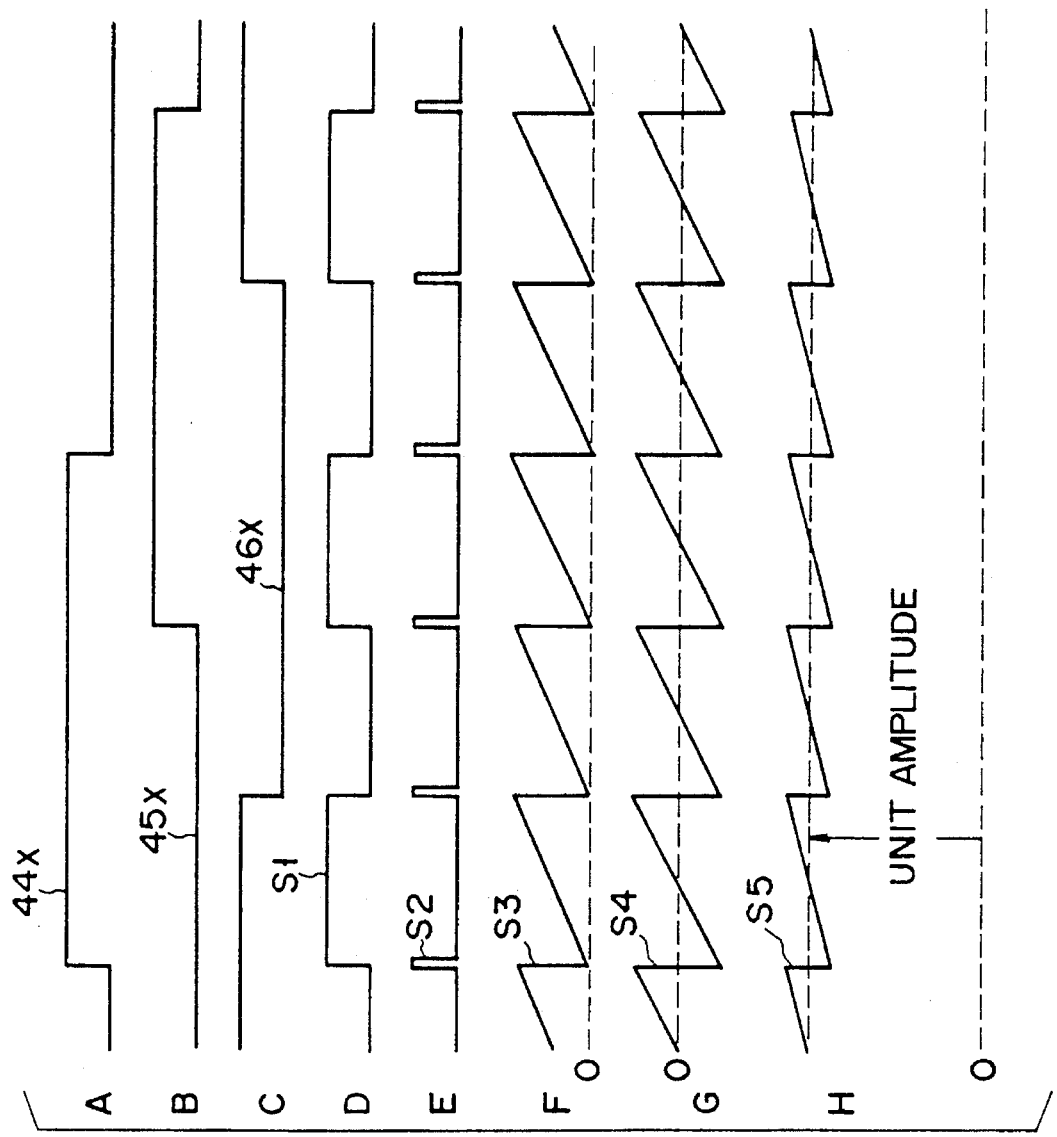
FIG. 14 is a waveform chart for explaining the function of the phase detector and the amplitude modulator.

FIG. 13 is a detailed diagram of amplitude modulator 6d and phase detector 9d, both of which are shown in FIG. 12. Reference numeral 5 denotes an output current amplitude reference; 28d to 30d, AND gates; 31d and 35d, OR gates; 32, a NOT gate; 33d and 34d, one-shot multivibrators; 36d, a counter; 37d, a register; 38d, a divider; 39d, a subtracter; 40d and 42d, multipliers; 41d, an adder; 43d, a bias circuit; 44d to 46d, switching timing signals for turning on/off the switching elements (21 to 26) of converter 3; 47d, a clock pulse; 48d and 50d, bias signals; 49d, a slip control signal; 51d, an amplitude upper limit reference of an output current from induction generator 2; and 52d, a lower limit reference thereof. Slip control signal 49d varies in response to change in the current detected by current detector 4 in FIG. 12.

FIGS. 14A to 14H are waveform charts for explaining operations of phase detector 9d and amplitude modulator 6d, both of which are shown in FIG. 13. Reference numeral 44d denotes a switching timing signal for U-phase transistors 21 and 22 of converter 3 in FIG. 12; 45d, a switching timing signal for V-phase transistors 23 and 24; and 46d, a switching timing signal for W-phase transistors 25 and 26.

Reference numerals 44d, 45d, and 46d denote signals which are changed every 180° of the output current phase of induction generator 2 and are 120° out of phase from each other. When signals 44d, 45d, and 46d are supplied to AND gates 28d to 30d and OR gate 31d, signal S1 which is changed every 60° of the output current phase appears at the output of OR gate 31d. when signal S1 is supplied to NOT gate 32d, one-shot multivibrators 33d and 34d, and OR gate 35d, pulse signal S2 which appears every 60° of the output current phase is obtained from OR gate 35d.

Clock pulses 47d are counted by counter 36d, and counter 36d is reset by pulse signal S2, so that saw-tooth wave S3 appears at the output of counter 36d. An amplitude of saw-tooth wave S3 is changed by the period of pulse signal S2 and a maximum amplitude value is stored in register 37d. Saw-tooth wave S3 is supplied to divider 38d and is divided by maximum amplitude e37d of saw-tooth wave S3 to obtain saw-tooth wave e38d having a unit amplitude at the output of divider 38d.

When saw-tooth wave e38d is supplied to subtracter 39d and bias signal 48d having a 0.5 unit amplitude is subtracted therefrom, and saw-tooth wave S4 having a unit amplitude centered on zero appears at the output of subtracter 39d. Saw-tooth wave S4 is supplied to multiplier 40d and is multiplied with slip control signal 49d to obtain product e40d. Bias signal 50d having the unit amplitude is added to product e40d by adder 41d to obtain saw-tooth wave S5 having an amplitude centered on the unit amplitude level. At this time, the amplitude of saw-tooth wave S5 can be changed in proportion to slip control signal 49d.

FIGS. 15A to 15G show operating waveforms obtained when a peak value of output current e4 from induction generator 2 is controlled to be flat. Referring to FIGS. 15A to 15G, reference symbol S6 denotes a positive reference of amplitude upper limit references 51d of the output current; and S7, a negative reference thereof. Negative reference S7 is obtained as an output from polarity reverser 70c in FIG. 9. Reference symbol S8 denotes a positive reference of amplitude lower limit references 52d of the output current; and S9, a their negative reference thereof. Negative reference S9 is obtained as an output from polarity reverser 71c in FIG. 9.

Reference symbol S10 denotes a U-phase current; and S11, a W-phase current. Reference symbol S12 denotes a signal representing ON/OFF states of U-phase transistors 21 and 22. When signal S12 is set at "0", transistor 21 is ON and transistor 22 is OFF. However, when signal S12 is set at "0", transistor 21 is OFF and transistor 22 is ON. Similarly, reference symbol S13 denotes a signal representing ON/OFF states of V-phase transistors 23 and 24. Reference symbol S14 denotes a signal representing ON/OFF states of W-phase transistors 25 and 26. Reference symbol S5 denotes a U-V line induced voltage; S16, a U-V line voltage; S17, a slip frequency of induction generator 2; S18, a phase angle between the output current and the induced voltage of induction generator 2; S19, a counter torque of induction generator 2; and S20, a power generated by induction generator 2.

The operating states shown in FIGS. 15A to 15G will be described with reference to FIGS. 9 and 12 to 14H. When slip control signal 49d in FIG. 13 is zero, an amplitude of the saw-tooth wave of output waveform S5 from adder 41d becomes zero. Output current amplitude reference 5 is subjected to a unit amplitude multiplication without saw-tooth modulation by multiplier 42d. Output 51d from multiplier 42d becomes flat, as indicated by S6. Similarly, output 52d from bias circuit 43d becomes flat, as indicated by S8. Outputs from polarity reversers 70c and 71c also become flat.

When U-phase current S10 reaches amplitude upper limit reference S6 at time t1, a pulse of level "1" appears at the output of comparator 72c to supply a set signal to flip-flop 96c. For this reason, the A output from flip-flop 96c goes to "1", and this signal passes through AND gate 114c and OR gate 126c to set transistor 21 switching command 57c to "1", thereby turning off transistor 21. At the same time, the B output from flip-flop 96c goes to "0", and this signal passes through AND gate 115c and OR gate 127c to set transistor 22 switching command 58c to "0", thereby turning on transistor 22.

When U-phase current S10 is decreased and reaches amplitude lower limit reference S8 at time t2, a pulse of level "1" appears at the output of comparator 74c, and this pulse passes through OR gate 90c to supply a set signal to flip-flop 97c. For this reason, the A output of flip-flop 97c goes to "1", and the signal of level "1" from flip-flop 97c is supplied to AND gate 116c. At this time, the A output of level "1" from flip-flop 96c, the B output of level "1" from flip-flop 98c, and the A output of level "1" from flip-flop 100c are supplied to AND gate 102c. When ON signal 136c= "1" is established, the output of AND gate 102c is set at "1", and then the output of OR gate 108c is set at "1". The output of NOT gate 112c is set at "0". Therefore, since the other input of each of AND gates 116c and 117c is set at "1", the A/B output signal from flip-flop 97c can pass through AND gates 116c and 117c.

Meanwhile, a signal of "0" is supplied from NOT gate 112c to the other input of each of AND gates 118c and 119c, and gating of the output from flip-flop 98c is inhibited. When the A output set in flip-flop 97c goes to "1" at time t2, this signal passes through AND gate 116c and OR gate 128c to set transistor 23 switching command 59c to "1", thereby turning off transistor 23. At the same time, the B output from flip-flop 77C goes to "0" and passes through AND gate 117c and OR gate 129c to set transistor 24 switching command 60c to "0", thereby turning on transistor 24. At this time, since transistors 22 and 26 have been kept ON, the transistors constituting the lower arm of converter 3 are simultaneously turned on, and the three-phase output terminals of induction generator 2 are simultaneously short-circuited. Therefore, the U-phase current is increased again.

When U-phase current S10 is increased and reaches amplitude upper limit reference S6 at time t3, a signal of level "1" appears at the output of comparator 76c, and this signal passes through OR gate 91c to supply a reset signal to flip-flop 97c. When flip-flop 97c is reset and the B output therefrom goes to "1", this signal passes through AND gate 117c and OR gate 129c to set transistor 24 switching command 60c to "1", thereby turning off transistor 24. At the same time, the A output from flip-flop 97c goes to "0", and this signal passes through AND gate 116c and OR gate 128c to set transistor 23 switching command 59c to "0", thereby turning on transistor 23. Therefore, the output terminal of induction generator 2 is released from a simultaneously three-phase short-circuiting state, thereby decreasing the U-phase current again.

In the subsequent operations, transistors 23 and 24 are ON/OFF-controlled, so that U-phase current S10 falls within the width between amplitude upper limit reference S6 and amplitude lower limit reference S3 of the output current.

When W-phase current S11 reaches negative reference S7 of the amplitude upper limit references at time t4, transistor 25 is turned on and transistor 26 is turned off as described above. When W-phase current S11 is decreased and reaches negative reference S9 of amplitude lower limit references, transistors 21 and 22 are ON/OFF-controlled as described above. W-phase current S11 is controlled to fall within the width between negative reference S7 of the amplitude upper limit references of the output current and negative reference S9 of the amplitude lower limit references of the output current. The subsequent operations are the same as those described above.

As described above, since peak values or values near the peaks of the output current are controlled within the width between positive reference S6 of the amplitude upper limit references and positive reference S8 of the amplitude lower limit references, or between negative reference S7 of the amplitude upper limit references and negative reference S9 of the amplitude lower limit references. Therefore, the amplitude upper and lower limit references and/or their waveforms are changed to allow changes in waveforms of output currents.

FIGS. 16A to 16G are operating waveforms obtained when values near the peak values of the output currents from induction generator 2 are controlled with an ascending slope. Reference numerals S6, S7, S10, and S12 to S20 denote the same signals in FIGS. 15A to 15G. When slip control signal 49d in FIG. 13 is given as a positive signal, a saw-tooth wave having an ascending slope represented by S5 in FIG. 14H appears at the output of adder 41d, and an amplitude upper limit reference having an ascending slope represented by S6 in FIG. 16A appears at the output of multiplier 42d.

For illustrative convenience, positive and negative references S8 and S9 of the amplitude lower limit references are omitted in FIGS. 16A to 16G. However, values near the peaks of the output currents can be controlled in the same manner as in FIGS. 15A to 15G. More specifically, these values are controlled with an ascending slope in accordance with positive or negative reference S6 or S7 of the amplitude upper limit references.

FIGS. 17A to 17G are operating waveforms obtained when values near peak values of output currents from induction generator 2 are controlled with a descending slope. When slip control signal 49d in FIG. 13 is given as a negative signal, a saw-tooth wave with a descending slope is obtained as output S5 from adder 41d, and an amplitude upper limit reference with a descending slope represented by S6 in FIG. 17A appears at the output of multiplier 42d. Values near the peak value of the output current are controlled in the same manner as in FIGS. 15A to 15G and are controlled with a descending slope in accordance with position or negative reference S6 or S7 of the amplitude upper limit references.

As described above, slip control signal 49d in FIG. 13 is changed to allow changes in shape (waveform) of the output current from induction generator 2. Since a waveform of a leading portion of the output current is mainly determined by an induced voltage of induction generator 2, the shapes of the peak value portions of the output current are controlled on the basis of amplitude upper and lower limit references 51d and 52d, and the phase angles between the output current and the induced voltage can be controlled. As the slip frequency of the induction generator is determined by a ratio of a torque component of the output current to an exciting component, the slip can be controlled by the phase angle control of the output current.

In an operating case in FIGS. 15A to 15G, an average value of phase angles S18 of the output current with respect to the induced voltages is −66°, and an average value of slip frequency S17 is −3.8 Hz; in an operating case in FIGS. 16A to 16G, an average value of phase angles S18 of the output current with respect to the induced voltages is −1°, and an average value of slip frequency S17 is −5.2 Hz; and in an operating case in FIGS. 17A to 17G, an average value of phase angles S18 of the output current with respect to the induced voltages is −53°, and an average value of slip frequency S17 is −2.8 Hz.

Slip control signal 49d is changed to allow control of the slip frequency of the induction generator.

In the above embodiment, values near peak values of the output current are controlled along a line having a predetermined inclination. However, the shape of the line is not limited to this, but may be replaced with any shape.

As has been described above, current waveform control according to the present invention is characterized in that the amplitude upper and lower limit references of the output current are given, and the output current is controlled to fall within the width between them. At that time, the amplitude reference is modulated in accordance with phases of the output current to control the phase angles between the output current and the induced voltages and the slip frequency of the induction generator. Excellent power generation control can be performed under any operating condition.

According to the present invention, since an output frequency is determined by switching control of the converter in accordance with changes in output current waveform, the output frequency need not be controlled with reference to a rotation detector, thus eliminating a need for a rotation detector.

Figure 18:
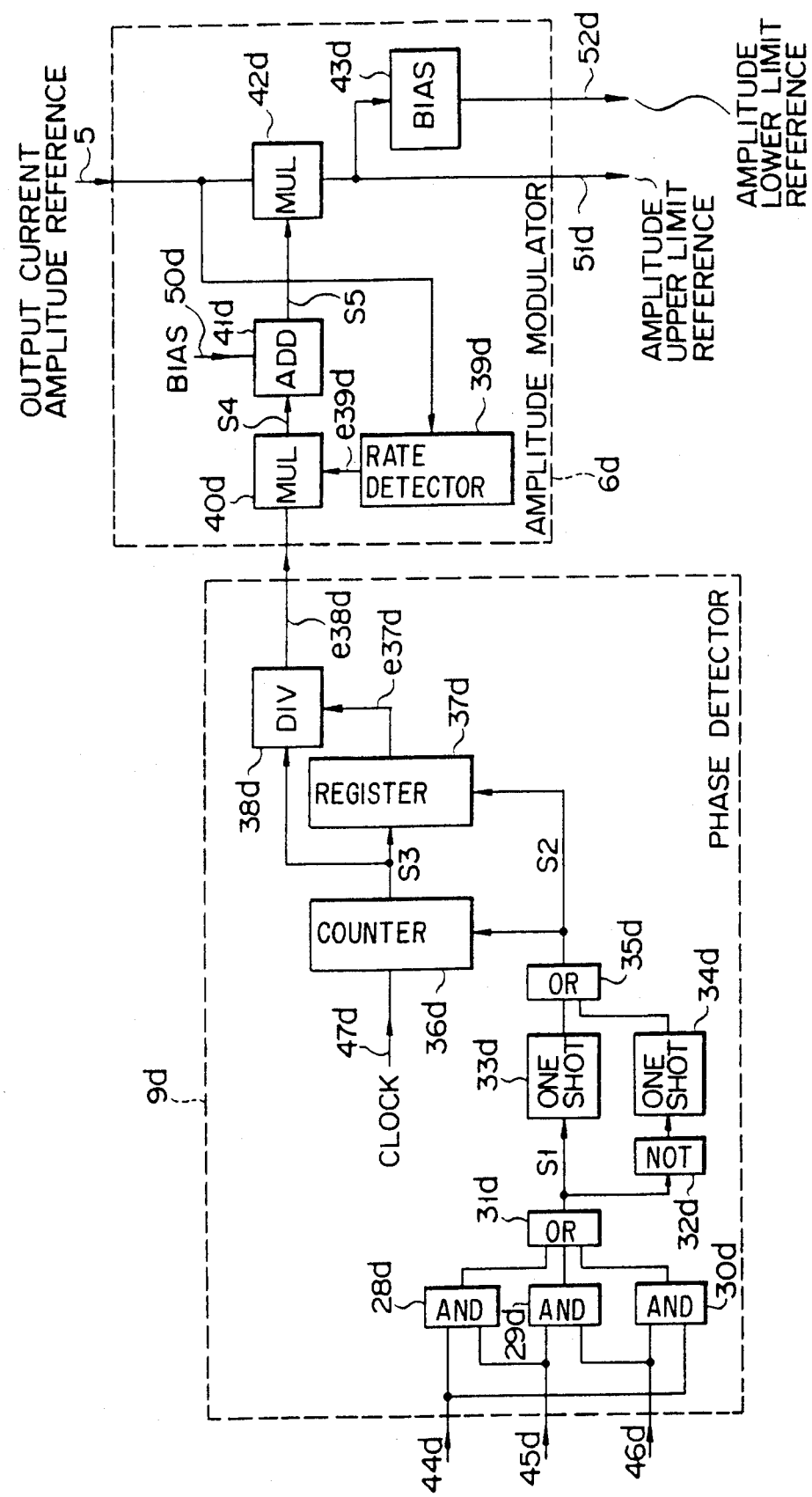
FIG. 18 is a diagram showing a detailed arrangement of an amplitude modulator and a phase detector in the embodiment shown in FIG. 12.
Figure 19:
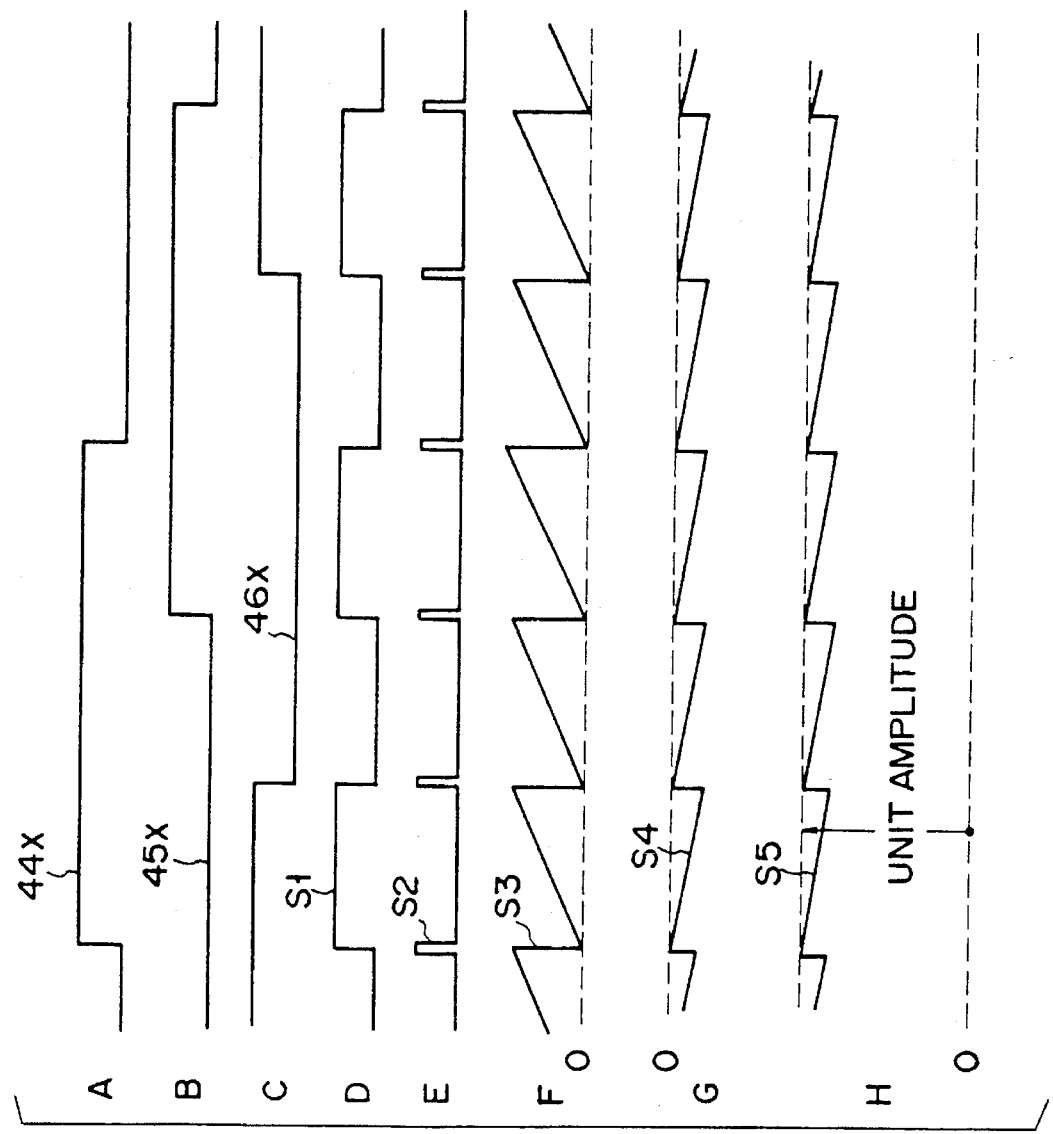
FIG. 19 is a waveform chart for explaining the function of the phase detector and the amplitude modulator.

FIG. 18 is another diagram showing amplitude modulator 6d and phase detector 9d, both of which are shown in FIG. 13 denote the same parts in FIG. 18. Reference numeral 39d denotes a rate detector for detecting rate e39d of change of output current amplitude reference 5. Rate e39d is represented by a DC voltage which is proportional to the gradient of amplitude reference S6 (or S7) in FIG. 20A.

FIGS. 19A to 19H are waveform charts for explaining operations of phase detector 9d and amplitude modulator 6d, both of which are shown in FIG. 18.

Output current amplitude reference 5 is supplied to rate detector 39d, and negative value e39d proportional to an increase rate of output current amplitude reference 5 appears at the output of rate detector 39d. Saw-tooth wave e38d of the unit amplitude appearing at the output of divider 38d is multiplied with negative value e39d appearing at the output of rate detector 39d by multiplier 40d. The waveform of e38d is the same as the waveform shown in FIG. 19G, except for the DC level thereof. Saw-tooth wave S4 oscillating in the negative direction in proportion to an increase rate of output current amplitude reference 5 appears at the output of multiplier 40d. Output S4 from multiplier 40d is input to adder 41d and added to output S4 of the unit amplitude derived from bias signal 50d to obtain saw-tooth wave S5 oscillating downward with respect to the unit amplitude.

FIGS. 15A to 15E show operating waveforms obtained when values near peak values of the output current from induction generator 2 are controlled to be flat while the rate of change of output current amplitude reference 5 is kept zero. Referring to FIGS. 15A to 15E, reference symbol S6 denotes a positive reference of amplitude upper limit references 51d of the output current; and S7, a negative reference thereof. Negative reference S7 is obtained as an output from polarity reverser 70c in FIG. 9. Reference symbol S8 denotes a positive reference of amplitude lower limit references 52d of the output current; and S9, a negative reference thereof. Negative reference S9 is obtained as an output from polarity reverser 71c in FIG. 9. Reference symbol S10 denotes a U-phase current of induction generator 2; and S11, a W-phase current. Reference symbol S12 denotes a signal representing ON/OFF states of U-phase transistors 21 and 22. When signal S12 is set at level "1", transistor 21 is ON and transistor 22 is OFF. However, when signal S12 is set at level "0", transistor 21 is OFF and transistor 22 is ON. Reference symbol S13 denotes a signal representing ON/OFF states of V-phase transistors 23 and 24; and S14, a signal representing ON/OFF states of W-phase transistors 25 and 26. Reference symbol S15 denotes a U-V line induced voltage; and S16, a U-V line voltage.

Figure 15:
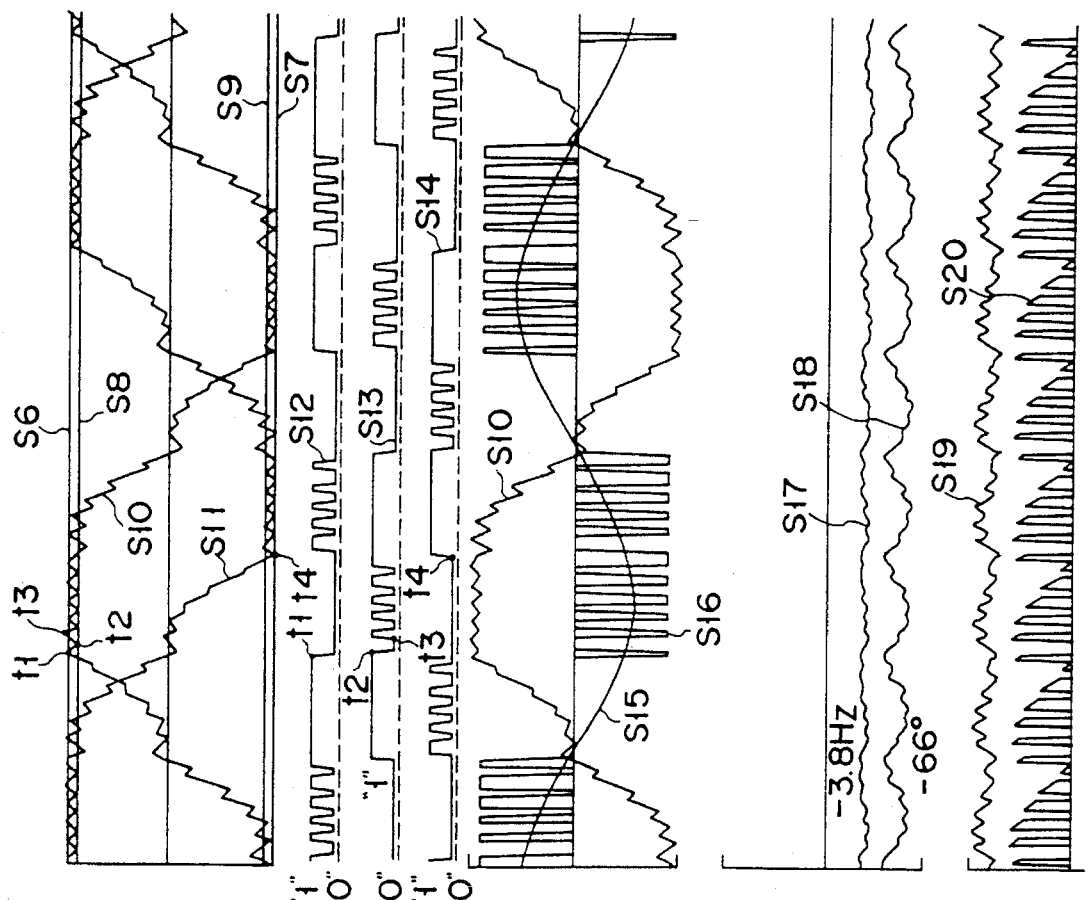
FIGS. 15A to 15G are waveform charts showing operations in a rectangular wave control mode in the embodiment shown in FIG. 12.
Figure 16:
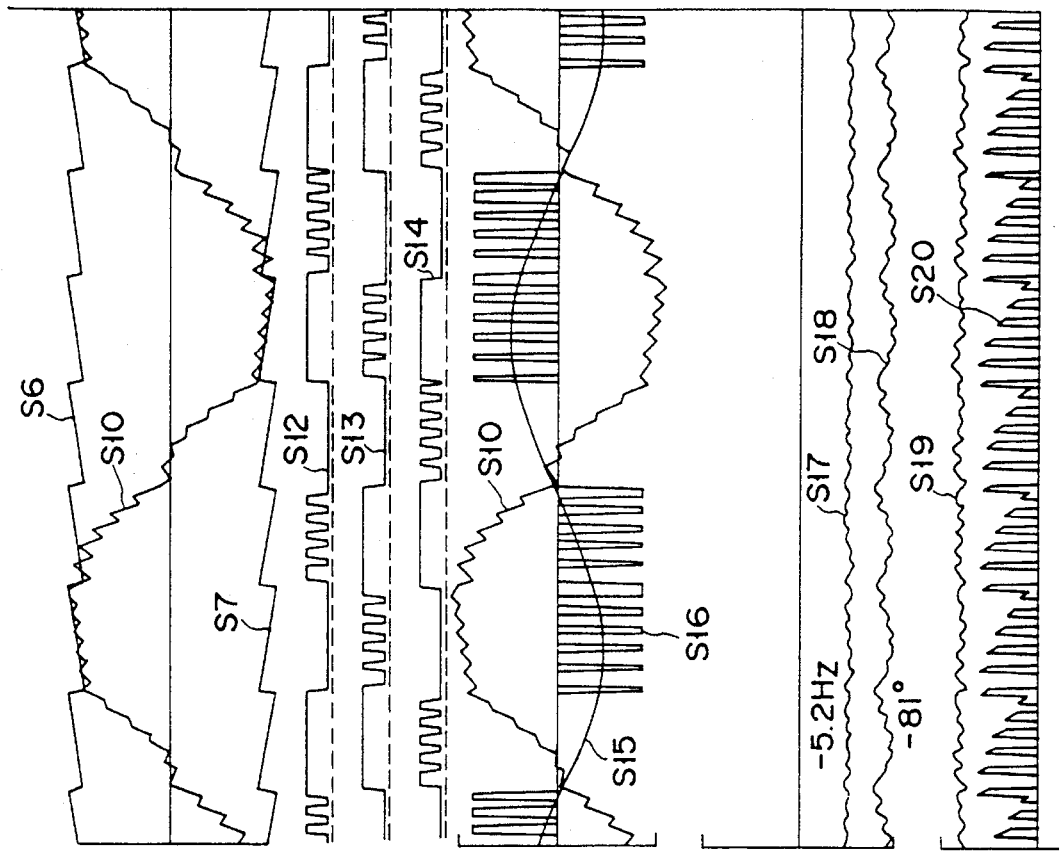
FIGS. 16A to 16G are waveform charts showing operations when a slip is increased by current waveform control in the embodiment shown in FIG. 12.
Figure 17:
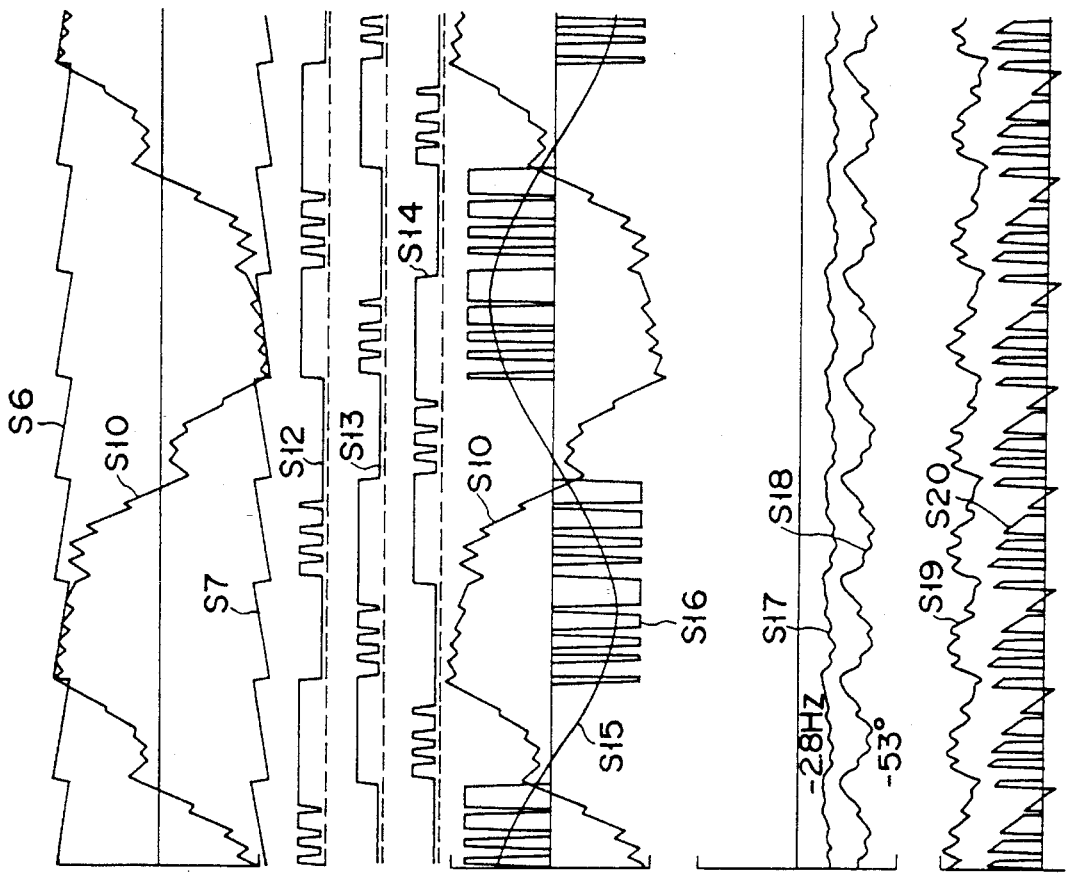
FIGS. 17A to 17G are waveform charts showing operations when a slip is decreased by the current waveform control mode in the embodiment shown in FIG. 12.

An operation of the arrangement shown in FIG. 18 will be described below. When a rate of change of output current amplitude reference 5 is zero, an output from rate detector 39d becomes zero. The amplitude of the saw-tooth wave having output waveform S5 from adder 41d becomes zero. Output current amplitude reference 5 is subjected to a unit amplitude multiplication without saw-tooth modulation by multiplier 42d, and output 51d from multiplier 42d becomes flat, as indicated by S6 (FIG. 15A). Similarly, output 52d from bias circuit 43d also becomes flat as represented by S8 (FIG. 15A). Outputs from polarity reversers 70c and 71c also become flat as indicated by S7 and S9 (FIG. 15A).

When U-phase current S10 reaches amplitude upper limit reference S6 at time t1, transistor 21 is turned off and transistor 22 is turned on. The U-phase current is decreased accordingly. When U-phase current S10 reaches amplitude lower limit reference S8 at time t2, transistor 23 is turned off and transistor 24 is turned on. At this time, since transistors 22 and 26 have been kept ON, transistors constituting the lower arm of converter 3 are simultaneously turned on to simultaneously short-circuit the three phases of the output terminal of induction generator 2. For this reason, the U-phase current is increased again.

When the U-phase current is increased and reaches amplitude upper limit reference S6 at time t3, transistor 24 is turned off and transistor 23 is turned on. Therefore, the output terminal of induction generator 2 is released from a simultaneously three-phase short-circuiting state. Therefore, the U-phase current is decreased again.

Similarly, transistors 23 and 24 are ON/OFF-controlled, and U-phase current S10 is controlled to fall within the width between amplitude upper limit reference S6 and amplitude lower limit reference S8 of the output current.

When W-phase current S11 reaches negative reference S7 of the amplitude upper limit references at time t4, transistors 25 and 26 are turned on.

When W-phase current S11 is decreased and reaches negative reference S9 of the amplitude lower limit references, transistors 21 and 22 are similarly ON/OFF-controlled, and W-phase current S11 is controlled to fall within the width between negative reference S7 of the amplitude upper limit references and negative reference S9 of the amplitude lower limit references. The subsequent operations are performed in the same manner as described above.

As described above, values near the peak values of the output current are controlled to fall within the width between positive reference S6 of the amplitude upper limit references and positive reference S8 of the amplitude lower limit references, or between negative reference S7 of the amplitude upper limit references and negative reference S9 of the amplitude lower limit references. The shapes of the amplitude upper and lower limit references are changed to allow changes in shape of the output current.

FIGS. 20A to 20F show operating waveforms obtained when rate detector 39d for output current amplitude reference 5 is net operated. Reference symbols S6, S7, and S10 to S16 as in FIGS. 15A to 15G denote the same parts in FIGS. 20A to 20F. Reference symbol S17 denotes an output from induction generator 2; and S18, a phase difference between output current and an induced voltage of induction generator 2. For illustrative convenience, positive and negative references S8 and S9 of the amplitude lower limit references are omitted. Values near the peak values of the output current are controlled in the same manner as in FIGS. 15A to 15G.

Figure 20:
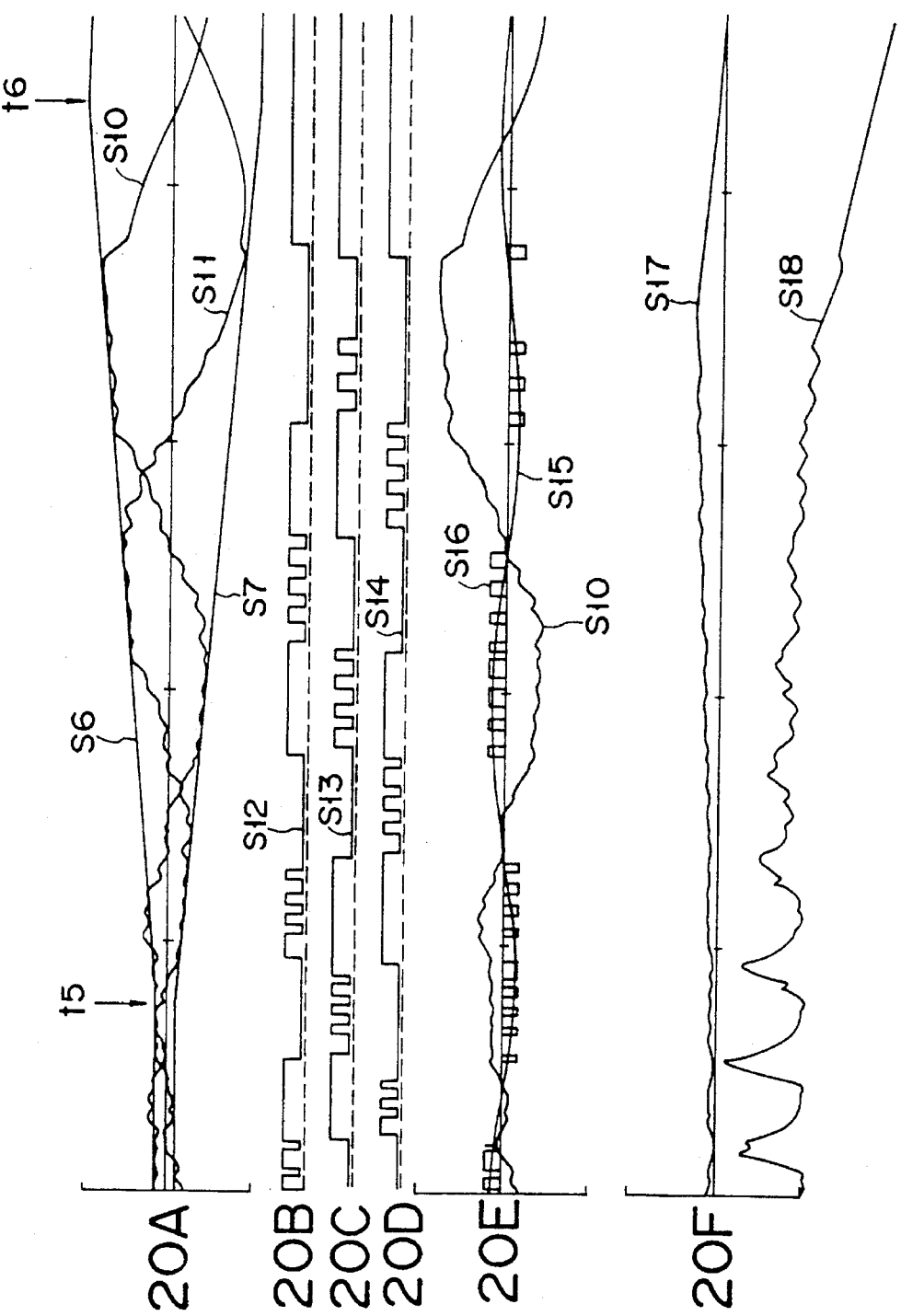
FIGS. 20A to 20F are waveform charts showing operations when an output current amplitude reference in the embodiment of FIG. 12 is increased.
Figure 21:
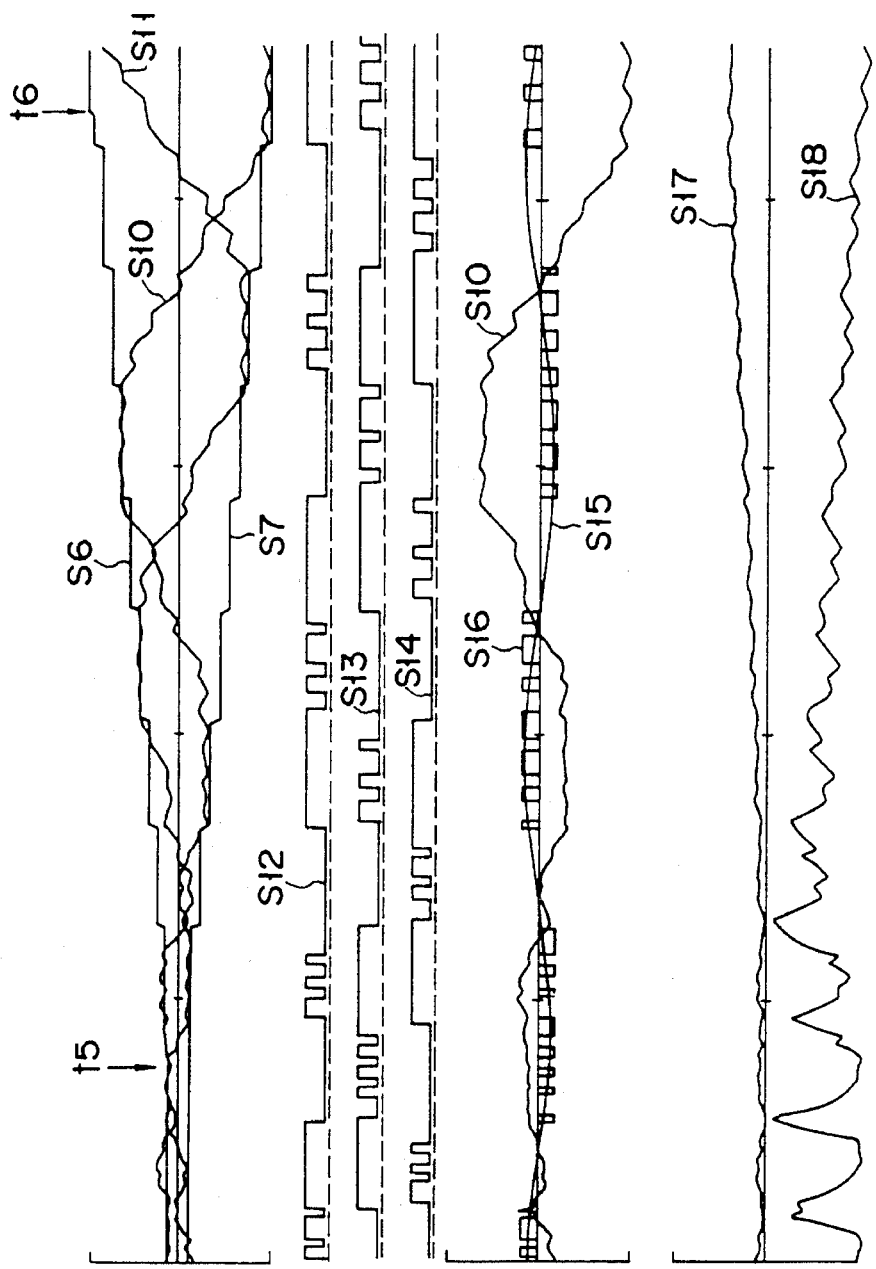
FIGS. 21A to 21F are waveform charts showing operations when the output current amplitude reference is amplitude modulated.

For a time interval between time t5 and time t6, output current amplitude reference 5 is increased with a predetermined change rate. A portion near the peak value of the output current has an ascending slope, as shown in FIG. 20A. Phase S18 of the output current is gradually delayed with respect to the induced voltage, and excitation cannot be maintained. Induced voltage S15 is attenuated, and output S17 from induction generator 2 is decreased to zero.

To the contrary, FIGS. 21A to 21F show operating waveforms obtained when amplitude modulation of output current amplitude reference 5 is performed according to the present invention. As in FIGS. 20A to 20F, when output current amplitude reference 5 begins to increase with a predetermined change rate at time t5, a negative signal corresponding to the rate of change of reference 5 appears at the output of rate detector 39d in FIG. 18. A saw-tooth wave having a descending slope indicated by S5 (FIG. 19H) appears at the output of adder 41. Output current amplitude reference 5 which is increasing with a predetermined rate is multiplied with output S5 from adder 41d by multiplier 42d. Positive and negative references S6 and S7 of the amplitude upper limit references of the output current are given as a stepwise waveform shown in FIG. 21A.

The values near the peak values of the output current are controlled in the same manner as in FIGS. 15A to 15G and are controlled to be almost flat in accordance with positive or negative reference S6 or S7 of the amplitude upper limit references. Phase angle S18 of the output current with respect to the induction voltage can fall within the width enough to maintain excitation of the induction generator. Output S17 from induction generator 2 is increased without decreasing induced voltage S15.

In the description of the above embodiment, the values near the peak values of the output current are controlled to be almost flat. However, these values may be controlled with a slightly descending slope. In the above embodiment, output current amplitude reference 5 is controlled with a predetermined ascending slope. This slope may be arbitrarily changed. That is, since a signal proportional to the rate of change of output current amplitude reference appears at the output of rate detector 39d, the gradient of the descending slope of saw-tooth wave S5 appearing at the output of adder 41d is proportional to the increase rate of output current amplitude reference 5. Therefore, values near the peak values of the output current can be controlled to be almost flat regardless of the change rate of output current amplitude reference 5.

Current waveform control of the present invention, as has been described above, is characterized in that the amplitude upper and lower limit values of the output current are given, and the output current is controlled to fall within the width between them. At that time, the amplitude reference is modulated in accordance with the change rate of the output current amplitude reference on the basis of the phases of the output current to control the output current waveform. Even during the process of changing the magnitude of the output current, the phase angles between the output current and induced voltage can be optimally controlled. Therefore, good power generation control can be performed under any operating condition.

According to the present invention, switching control of the converter is performed in accordance with changes in output current waveform to determine the output frequency. The output frequency need not be controlled with reference to a rotation detector, and the rotation detector can be omitted.

Figure 22:
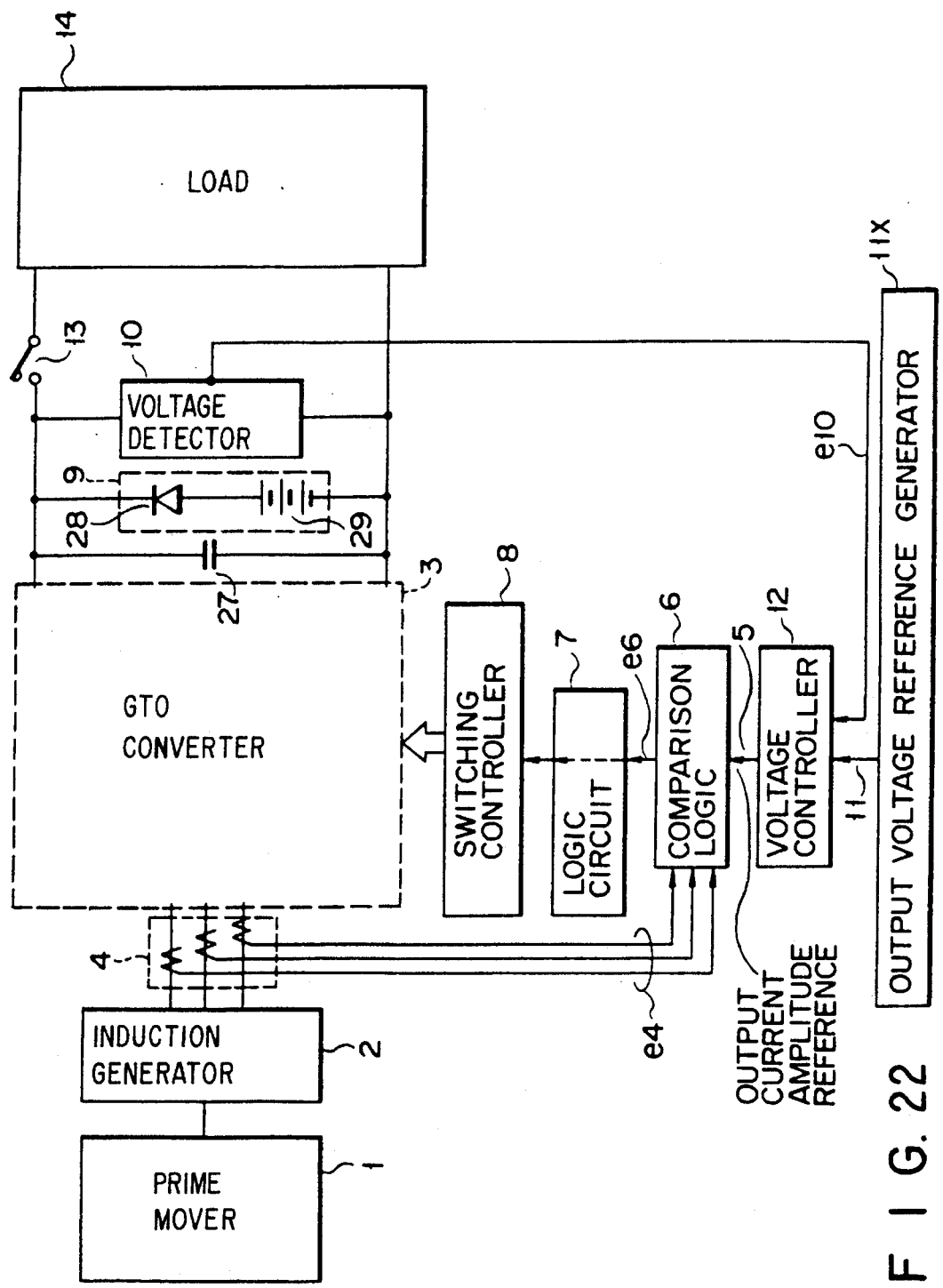
FIG. 22 shows a modification of FIG. 1.

In the above description, bipolar transistors are used as the switching elements constituting the converter. However, another switching means such as a gate turn-off thyristor (GTO) may be used to constitute converter 3, as shown in FIG. 22. A switching element other than the GTO, or a thyristor circuit having a forced commutation circuit may also be used to constitute the converter.

According to the present invention as has been described above, a rotation detector need not be located near the prime mover where operating conditions such as vibrations, temperature, and humidity are severe. Therefore, any trouble caused by a failure of the rotation detector can be eliminated.

In the conventional arrangement, an output signal from a rotation detector is disturbed by vibrations and electromagnetic noise of a prime mover, and an output current of the induction generator controlled on the basis of the output from the rotation detector is disturbed to disable stable power generation control. However, stable power generation control can be performed according to the present invention.

When precision of a rotation detector is poor, an output current waveform of the induction generator is distorted, and good characteristics cannot be obtained, thus requiring a high-precision, expensive rotation detector. According to the present invention, however, since the rotation detector can be omitted, the cost of the rotation detector, the wiring cost, and maintenance cost can be saved.

According to the present invention, current waveform control is performed for the induction generator, the phase angles between the output current and induced voltage of the generator can be controlled, and stable power generation control can be performed under any operating condition.

Current waveform control according to the present invention is performed to control the phase angles between the output current and induced voltage, and the slip frequency of the induction generator can be controlled. Therefore, power generation with an optimal slip can be performed in any operating condition.

Current waveform control according to the present invention is performed to improve the waveform of the phase current in the region of low frequencies, and the output can be increased. For example, in the operation shown in FIGS. 11A to 11F, an output could be increased by 66% as compared with the operation in FIGS. 10A to 10F wherein maximum values of the phase currents remained the same.

PWM control according to the present invention can improve the waveform of the phase current in the region of low frequencies, and the output can be increased. For example, in the operation of FIGS. 8A to 8F, an output could be increased by 17% as compared with the operation in FIGS. 7A to 7F under the condition wherein maximum values of phase currents remain the same.

According to the present invention, there is provided a high-reliability, high-performance, low-cost power generation system.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A power generation system comprising:

means for generating Ac power;

means for converting the AC power to DC power;

means for detecting an AC current flowing from said generating means to said converting means to provide an AC current signal;

means for generating a current amplitude reference which determines an amplitude of said AC current; and means for comparing said AC current signal with said current amplitude reference to provide a comparison result;

means for controlling said converting means in accordance with said comparison result, and for controlling a peak value of the amplitude of said AC current to not exceed a value defined by said current amplitude reference; and means for comparing said AC current signal with each of a given pulse-width-modulation amplitude reference and said current amplitude reference, and generating a switching command to turn off said switching elements each time when said AC current signal matches either one of said pulse-width-modulation amplitude reference and said current amplitude reference;

wherein said converting means includes self-extinguishing switching elements.

2. A system according to claim 1, wherein said generating means includes:

prime mover means for providing a mechanical rotating output; and generator means for converting a kinetic energy of the mechanical rotating output into an electric energy to generate said AC power.

3. A system according to claim 2, wherein said generator means includes an induction generator.

4. A system according to claim 2, wherein at the time of starting said generator, said current amplitude reference gradually increases so that the amplitude of said AC current does not exceed the amplitude corresponding to said current amplitude reference.

5. A system according to claim 2, wherein said prime mover means includes a diesel engine.

6. A system according to claim 2, wherein said prime mover means includes a turbine.

7. A system according to claim 1, further comprising:

an initial exciting DC power source coupled to a DC power output circuit of said converting means.

8. A system according to claim 1, wherein said switching elements include bipolar transistors.

9. A system according to claim 1, wherein said switching elements include gate-turn off thyristors.

10. A power generation system comprising:

an induction generator driven by a prime mover;

a converter for converting an AC output from said induction generator into a DC output;

an initial excitation DC power source connected to the DC output from said converter;

a current detector for detecting an output current of said induction generator;

means for generating an output current amplitude reference for said induction generator;

a comparison logic for comparing the output current amplitude reference with an output from said current detector and generating a switching command for switching elements constituting said converter;

a logic circuit for supplying a switching inhibition condition of said converter to an output signal from said comparison logic;

a switching controller for controlling said switching elements of said converter in accordance with an output signal from said logic circuit; and means for gradually increasing the output current amplitude reference controlling said converter controlling the output current of said induction generator does not exceed the output current amplitude reference, and raising stepwise an output voltage of said induction generator.

\* \* \* \* \*